(12) United States Patent
Takihiro et al.

(10) Patent No.: US 6,278,712 B1
(45) Date of Patent: Aug. 21, 2001

(54) NETWORK AND SWITCHING NODE IN WHICH RESOURCE CAN BE RESERVED

(75) Inventors: Masatoshi Takihiro, Fujisawa; Takeshi Ishizaki; Shuji Ohno, both of Yokohama; Masataka Ohta, Machida; Naoya Ikeda, Ebina, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/070,736

(22) Filed: May 1, 1998

(30) Foreign Application Priority Data

May 8, 1997 (JP) .................................................. 9-117739
Jul. 14, 1997 (JP) .................................................. 9-188317

(51) Int. Cl.$^7$ ............................. H04L 12/28; H04L 12/56
(52) U.S. Cl. .......................................... 370/400; 370/356
(58) Field of Search ............................. 370/400, 285, 370/299, 329, 351, 353, 356, 359, 360, 367, 387, 396, 401, 402, 404, 405, 406, 408, 412, 413, 415, 417, 419, 420, 428, 429

(56) References Cited

U.S. PATENT DOCUMENTS

| | | | |
|---|---|---|---|
| 5,687,167 | * 11/1997 | Bertin et al. | 370/254 |
| 5,742,772 | * 4/1998 | Sreenan | 709/226 |
| 5,881,050 | * 3/1999 | Chevalier et al. | 370/230 |
| 5,933,412 | * 8/1999 | Choudhury et al. | 370/218 |
| 5,940,372 | * 8/1999 | Bertin et al. | 370/238 |
| 6,011,776 | * 1/2000 | Berthaud et al. | 370/232 |
| 6,011,804 | * 1/2000 | Bertin et al. | 370/468 |
| 6,092,113 | * 7/2000 | Naeshima et al. | 709/230 |
| 6,118,762 | * 9/2000 | Nomura et al. | 370/230 |

* cited by examiner

Primary Examiner—Dang Ton
Assistant Examiner—Phirin Sam
(74) Attorney, Agent, or Firm—Antonelli, Terry, Stout & Kraus, LLP

(57) ABSTRACT

A user terminal sends a resource reservation request message in which time information indicative of time to perform a communication is designated to a switching node to which the self user terminal is linked. The switching node manages a reservation state of each of resources which can be used by the self switching node among resources of a network together with time information indicative of time when a communication using the resource is performed. When the resource reservation request message is received, an unreserved resource is obtained at a time indicated by the time information designated in the resource reservation request message, the obtained resource is reserved, and a resource reservation result notice message indicative of the reservation result is returned to the user terminal. A resource management server is also provided so as to reserve a network resource with a simple operation. The reservation can be performed in consideration of priority and cost of a communication. Reservation information can be always recognized by a client. When resource reservation is failed, an alternative plan is automatically calculated and presented.

19 Claims, 39 Drawing Sheets

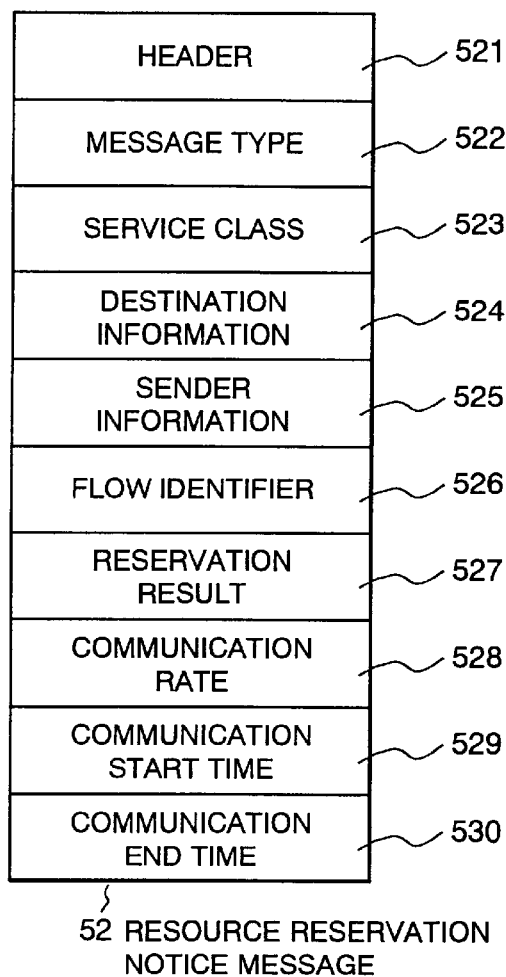

FIG. 7

210 RESOURCE MANAGEMENT TABLE

| RESOURCE TYPE | | LINE CAPACITY |
|---|---|---|
| LINE INTERFACE #1 | INCOMING LINE | 100Mbps |
| | OUTGOING LINE | 100Mbps |
| LINE INTERFACE #2 | INCOMING LINE | 50Mbps |
| | OUTGOING LINE | 80Mbps |
| ⋮ | | |
| LINE INTERFACE #n | INCOMING LINE | 75Mbps |
| | OUTGOING LINE | 90Mbps |

FIG. 8

214 RESERVED RESOURCES MANAGEMENT TABLE

| FLOW IDENTIFIER | RESERVED COMMUNI- CATION BAND | INCOMING LINE I/F NUMBER | OUTGOING LINE I/F NUMBER | DESTI- NATION INFOR- MATION | SENDER INFORMA- TION | RESERVED COMMUNICATION TIME | RESER- VATION PRIORITY LEVEL |
|---|---|---|---|---|---|---|---|
| a | 64 Kbps | 1 | 2 | 4-2 | 4-1 | START: 97/01/29 13:00<br>END : 97/01/29 15:00 | PRIORITY |
| b | 1.5 Mbps | 1 | 3 | 4-3 | 4-1 | START: 97/01/29 23:30<br>END : 97/01/30 02:00 | NON- PRIORITY |
| ... | ... | ... | ... | ... | ... | ... | ... |

FIG. 13

220 TRAFFIC CONTROL INFORMATION

| FLOW IDENTIFIER | RESERVED COMMUNICATION BAND | OUTGOING LINE I/F NUMBER |
|---|---|---|
| a | 64Kbps | 2 |
| b | 1.5Mbps | 2 |
| c | 64Kbps | 3 |
| ⋮ | ⋮ | ⋮ |

53 FAILURE NOTICE MESSAGE

FIG. 21

210-1 RESOURCE MANAGEMENT TABLE 210-2 RESOURCE MANAGEMENT TABLE

| RESOURCE TYPE | | LINE CAPACITY |
|---|---|---|
| LINE INTERFACE #1 | INCOMING LINE | 100Mbps |
| | OUTGOING LINE | 100Mbps |
| LINE INTERFACE #2 | INCOMING LINE | 50Mbps |
| | OUTGOING LINE | 80Mbps |
| ⋮ | | |
| LINE INTERFACE #n | INCOMING LINE | 75Mbps |
| | OUTGOING LINE | 90Mbps |

| OUTGOING LINE | 90Mbps |
|---|---|

| OUTGOING LINE | 90Mbps |
|---|---|

| OUTGOING LINE | 90Mbps |
|---|---|

210-3 RESOURCE MANAGEMENT TABLE 210-4 RESOURCE MANAGEMENT TABLE

55 TRAFFIC CONTROL INFORMATION NOTICE MESSAGE

FIG. 29

RESOURCE RESERVATION REQUEST

- 510 NAME OF RESOURCE RESERVATION SERVER : rsvmain@xxx.yyy.co.jp [CHANGE OF SERVER...]
- 520 COMMUNICATION DESTINATION: SALES DEPARTMENT'S VIDEO SERVER ▼ [DEFINITION...] 540
- 530 COMMUNICATION QUALITY: REALTIME VIDEO, AUDIO (1.5Mbps) ▼ [DEFINITION...] 550
- 560 DATE AND TIME
  - START DATE AND TIME: 1997/01/06  15:00
  - END DATE AND TIME: 1997/01/06  17:00
- 570 COMMUNICATION BAND: 1.5Mbps
- 580 COMMUNICATION VOLUME: —

[OK] 590  [CANCEL] 595    500

FIG. 30

COMMUNICATION DESTINATION TEMPLATE

- 610 NAME OF TEMPLATE: SALES DEPARTMENT'S VIDEO SERVER ▼
- 620 NAME OF HOST: vserv@sales.xxx.co.jp
- 630 PORT NUMBER: 1234

[OK] 640  [CANCEL] 650    600

| SARVICE CLASS | COST | COMMUNICATION DATE AND TIME | COMMUNICA-TION BAND | COMMUNICA-TION VOLUME | RESERVATION PRIORITY LEVEL |
|---|---|---|---|---|---|
| A | 5 | DESIGNATED | DESIGNATED | — | PRIORITY |
| A- | 4 | DESIGNATED | DESIGNATED | — | NON-PRIORITY |
| B | 3 | DESIGNATED | — | DESIGNATED | PRIORITY |
| B- | 2 | DESIGNATED | — | DESIGNATED | NON-PRIORITY |
| C | 1 | — | — | — | NON-PRIORITY |

FIG. 37

```
┌─────────────────────────────────────────────────────────────┐
│ ▭  RESOURCE RESERVATION DETAIL                        _  ×  │
├─────────────────────────────────────────────────────────────┤
│                                                             │
│  RESERVER          TANAKA @SALES DEPARTMENT                 │
│  ┌─ COMMUNICATION DESTINATION ──────────────────────────┐   │
│  │ NAME           SALES DEPARTMENT'S VIDEO SERVER       │   │
│  │ NAME OF HOST   vserv@sales.xxx.co.jp                 │   │
│  │ PORT NUMBER    1234                                  │   │
│  └──────────────────────────────────────────────────────┘   │
│  ┌─ COMMUNICATION QUALITY ──────────────────────────────┐   │
│  │ BAND           1.5Mbps                               │   │
│  │ QUALITY        REALTIME VIDEO,AUDIO (1.5Mbps)        │   │
│  └──────────────────────────────────────────────────────┘   │
│   START DATE AND TIME    1997/01/06  15:00                  │
│   END DATE AND TIME      1997/01/06  17:00                  │
│   RESERVATION RECEIPT NUMBER : 3872                         │
│   NAME OF RESOURCE       : rsvmain@xxx.yyy.co.jp            │
│   RESERVATION SERVER                                        │
│                                                             │
│         ┌───────┐  ┌─────────────┐  ┌─────────────┐         │
│         │ CLOSE │  │ RESERVATION │  │ RESERVATION │         │
│         │       │  │ CHANGE...   │  │ CANCELLATION│         │
│         └───────┘  └─────────────┘  └─────────────┘         │
└─────────────────────────────────────────────────────────────┘
```

- 1310: RESERVER
- 1320: COMMUNICATION DESTINATION
- 1330: COMMUNICATION QUALITY
- 1340: START DATE AND TIME
- 1350: END DATE AND TIME
- 1360: RESERVATION RECEIPT NUMBER
- 1370: NAME OF RESOURCE RESERVATION SERVER
- 1380: CLOSE
- 1385: RESERVATION CHANGE
- 1390: RESERVATION CANCELLATION
- 1300

FIG. 38

| | |
|---|---|
| HEADER | 1410 |
| RESOURCE RESERVATION REQUEST | 1420 |
| REQUESTING PERSON'S IDENTIFICATION | 1430 |
| COMMUNICATION DESTINATION INFORMATION | 1440 |
| COMMUNICATION QUALITY INFORMATION | 1450 |
| COMMUNICATION TIME INFORMATION | 1460 |
| REQUESTING PERSON'S CERTIFICATION INFORMATION | 1470 |

1400

NETWORK AND SWITCHING NODE IN WHICH RESOURCE CAN BE RESERVED

BACKGROUND OF THE INVENTION

The present invention relates to a technique for reserving a resource to be used in a future communication in accordance with a request from a user terminal in a network to which a plurality of switching nodes each linking a plurality of user terminals are connected. More particularly, the invention relates to a method of reserving a network resource such as a network band and a communication quality level in a computer network in which a plurality of network nodes are connected.

With improvement in computer technology and communication technology, the desire for real-time communication of audio data and video data is becoming stronger. Especially, in a network such as the internet which does not guarantee the communication quality, such a request is becoming stronger.

In order to perform the real-time communication, it is necessary to assure dedicated resources at the time of communication. As a resource reservation protocol in the internet, the resource reservation protocol (RSVP) is being examined by the internet engineering task force (IETF).

In a new network such as ATM, when a communication is started, resources for satisfying the communication quality adapted to the kind of communication are preliminarily assured by the signalling protocol Q.2931 and the communication is performed.

In the foregoing conventional techniques, it is necessary for a user terminal to issue a request for assuring the resource at the start time point of the communication. Even when the start time and end time of the communication are preliminarily known, the resources used during the communication cannot be preliminarily assured.

For example, with respect to a communication requiring a real-time performance such as a television conference whose holding time is preliminarily known, when the resource has been already assured by another communication at the start time point of the communication, a problem such that the sufficient quality of the communication cannot be guaranteed occurs.

Especially, in order to transmit multimedia data without interruption in an open network environment represented by the internet, it is necessary to assure the communication quality desired by the user in such a manner that switching nodes on a communication path assure resources necessary for the multimedia communication. As a technique for achieving the object, a communication protocol called a resource reservation protocol is examined in the above-mentioned internet engineering task force.

In the ATM (Asynchronous Transfer Mode) network, by designating the requested communication quality, band, and the like at the time of a setting of ATM switching devices as nodes in the network, the desired communication quality can be assured.

In the conventional techniques, the communication protocol for assuring the necessary network resources at the time of an actual communication is specified. Consequently, the network resource cannot be reversed until the start of the communication.

In order to reserve the network resource in the conventional techniques, a high degree of knowledge regarding the network resource is necessary. An end user of the network cannot easily reserve it.

Further, since the reservation state of the network resource cannot be known in the conventional techniques, it is difficult to try to reserve other resources by changing the conditions.

In the conventional techniques, further, there is not provided a method of permitting or rejecting a reservation by totally discriminating information such as the network use right of the user, priority of communication, and the like when it is determined whether the network resource can be reserved or not.

SUMMARY OF THE INVENTION

It is, therefore, a first fundamental object of the invention to enable a resource which will be used in a future communication to be reserved in order to solve the problems.

Among communications, there is a communication which does not always require a real-time performance such as a communication in which it is sufficient to transfer a file of a certain quantity until a certain time.

There is a case such that resources are already reserved by communications which do not require the real-time performance and a resource which is used for the communication requiring the real-time performance cannot be assured.

When the resource is used by the communication which does not require the real-time performance and the resource to be used for the communication requiring the real-time performance cannot be assured, it is a problem since the resource is not effectively used.

In order to solve the problem, it a second fundamental object of the invention is to enable the resource to be effectively used in addition to the first object.

It can be realized by, for example, reserving a resource used for a communication which does not require the real-time performance at an arbitrary time when the activity ratio of resources is low.

According to the invention, in order to achieve the first object, there is provided as a first mode a network connecting a plurality of switching nodes to which a plurality of user terminals are linked.

Each of the plurality of user terminals has a reservation requesting unit for sending a resource reservation request in which time information indicative of time to perform a communication is designated to a switching node to which the self user terminal is linked.

Each of the plurality of switching nodes includes:

a managing unit for managing a reservation state of each of resources which can be used by the self switching node among resources of the network together with time information indicative of time when a communication using the resource is performed, and a reserving unit for obtaining a resource which is not reserved at a time indicated by the time information when the resource reservation request in which the time information is designated is received and for reserving the obtained resource as a resource to be used for the communication performed at the time shown by the time information.

According to the first mode, when the user designates a time to execute a communication in addition to the information such as the communication quality which is conventionally designated, the network reserves an unreserved resource at the designated time, so that the resource which will be used in a future communication can be reserved.

According to the first mode, the reservation requesting unit further designates priority information indicative of reservation priority of the relevant communication in the resource reservation request.

The managing unit further manages the priority information indicative of the reservation priority of the communication using the resource with respect to each of the resources which can be used by the self switching node among the resources of the network.

The reserving unit invalidates any reservation of a resource used for a communication having the reservation priority lower than the reservation priority shown by the priority information among the resources reserved at the time shown by the time information and reserves the resource whose reservation is invalidated as a resource to be used for the communication performed at the time shown by the time information when the resource reservation request in which the time information and the priority information is designated is received and there is no unreserved resource at the time indicated by the time information.

Consequently, even when necessary resources are short, by invalidating the reservation of the resource used for a communication having lower reservation priority, the network can preferentially reserve the resource used for a communication having higher reservation priority.

According to the invention, in order to achieve the second object, there is provided as a second mode a network connecting a plurality of switching modes to which a plurality of user terminals are linked.

Each of the plurality of user terminals has a reservation requesting unit for sending a resource reservation request in which permissible time range information indicative of a permissible time range of time in which a communication is performed and communication quantity information indicative of the quantity of data transferred by the communication is designated to a switching node to which the self user terminal is linked.

Each of the plurality of switching nodes includes:
  a managing unit for managing a reservation state of each of resources which can be used by the self switching node among resources of the network together with time information indicative of time when a communication using the resource is performed, and
  a reserving unit for obtaining an arbitrary time when the activity ratio of the resource is low within the permissible time range indicated by the permissible time range information and a resource which is not reserved at the arbitrary time and for reserving the obtained resource as a resource to be used for the communication for transferring data of the quantity indicated by the communication quantity information at the obtained time when the resource reservation request in which the permissible time range information and the communication quantity information is designated is received.

According to the second mode, with respect to a communication which does not require the real-time performance such as a communication in which it is sufficient to complete a transfer of a file of a certain quantity until a certain time, when the user designates the permissible time range of time to perform the communication and communication quantity information indicative of the quantity of data transferred by the communication, the network reserves an unreserved resource at an arbitrary time when the resource activity ratio is low within the designated permissible time range. Consequently, the resource used for a future communication can be reserved and the resource can be effectively used.

According to the second mode, the reservation requesting unit further designates priority information indicative of reservation priority of the relevant communication in the resource reservation request.

The managing unit further manages the priority information indicative of the reservation priority of a communication using a resource with respect to each of resources which can be used by the self switching node among the resources of the network.

When the resource reservation request in which the permissible time range information, the communication quantity information and the priority information is designated is received and there is no unreserved resource within the permissible time range indicated by the permissible time range information, the reserving unit invalidates any one of the reservations of the resources used for a communication having reservation priority lower than the reservation priority indicated by the priority information among the reserved resources within the permissible time range indicated by the permissible time range information and reserves the resource whose reservation is invalidated as a resource used for a communication for transferring data of the quantity indicated by the communication quantity information at the time the resource was reserved.

Consequently, even when necessary resources are short, by invalidating a reservation of a resource used for a communication having a lower reservation priority, the network can preferentially reserve a resource which is used for a communication having a higher reservation priority.

According to a third mode of the invention, also in each of the first and second modes, each of the plurality of switching nodes has reservation a request transferring unit for transferring the received resource reservation request to another switching node which is the next node in a communication path to a destination side user terminal of a communication using the resource reserved by the reserving unit.

Thus, in all of switching nodes in a communication path from a transmission side user terminal to a destination side user terminal of a future communication, resources used for the communication can be reserved.

According to a fourth mode of the invention, in the third mode,
  each of the plurality of switching nodes has:
    a reservation state notifying unit for notifying all of other switching nodes of a reservation state when the reserving unit reserves a resource, and
    a storing unit for storing and holding the same management contents as those of the managing means of all of the other switching nodes in accordance with the reservation state notified from the other switching node.

The reservation request transferring unit selects another switching node having many unreserved resources as a transfer destination of the received resource reservation request on the basis of the stored contents of the storing unit.

Consequently, each of the switching nodes can know the reservation states of the resources in all of the other switching nodes and transfer the resource reservation request to another switching node having many unreserved resources, so that the resource use efficiency can be further improved.

According to a fifth mode of the invention, in the third or fourth mode,
  each of the plurality of switching nodes has:
    a failure notice sending unit, when there is a resource which cannot be maintained to be reserved by a failure detected by the self switching node and a transmission side user terminal and a destination side user terminal of the communication using the resource are not linked to the self switching node, for sending a failure notice indicative of the communication using the resource to both of another switching node which is the next node of a communication path to the transmission side user terminal and another switching node which is the next node of a communication path to the destination side user terminal, a failure notice transferring unit, when the failure notice is received from another switching node and a transmission side user terminal and a destination side user terminal of the communication indicated by the failure notice are not linked to the self switching node, for transferring the received failure notice to both of another switching node which is the next node of a communication path to the transmission side user terminal and another switching node which is the next node of a communication path to the destination side user terminal, and a re-reserving unit, when there is a resource which cannot be maintained to be reserved by a failure detected by the self switching node and a transmission side user terminal of a communication using the resource is linked to the self switching node, for generating a resource reservation request of the communication using the resource and for transferring the generated resource reservation request to another switching node which is the next node of another communication path to a destination side user terminal of the communication using the resource, and when a failure notice is received from another switching node and a transmission side user terminal of a communication shown by the failure notice is linked to the self switching node, for generating a resource reservation request of the communication indicated by the failure notice and for transferring the generated resource reservation request to another switching node which is the next node of another communication path to the destination side user terminal of the communication indicated by the failure notice.

Consequently, even if there is a resource which cannot be maintained to be reserved by a failure, re-reservation can be performed for the communication using the resource without letting the user know the failure.

It is a developed object of the invention to make an end user who does not have a high degree of knowledge regarding the network resource easily reserve a network resource, and further, to provide a reservation template defining function for realizing a simpler operation.

Another developed object of the invention is to provide a function useful when a resource cannot be reserved and another reservation is tried.

Further another developed object of the invention is to enable flexible network resource management following the operation policy of an organization operating the network to be realized.

A developed characteristic of the invention is that a user interface program to be executed by user equipment and a network resource management program to be executed by a server and a node are used to realize the above-mentioned network resource reservation. Consequently, even an end user who does not have a high degree of knowledge regarding the network resource can easily reserve the network resource. The reservation template defining function for realizing a simpler operation is also provided.

It is another developed characteristic of the invention that the reason of a refusal of network resource reservation is presented to the user when the network resource reservation is refused and a present reservation state can be always looked, thereby realizing a function which is useful when the resource cannot be reserved and another reservation is tried.

According to further another developed characteristic of the invention, when the network resource reservation is performed, determination based on the right of a person requesting the reservation, the priority of the communication, and the like can be executed. Consequently, flexible network resource management following the operation policy of an organization operating the network can be realized.

BRIEF DESCRIPTION OF THE DRAWINGS

FIG. 3 is a diagram showing the structure of a resource reservation result notice message in the first embodiment;

FIG. 4 is a diagram illustrating a specific example of service classes in the first embodiment;

FIG. 7 is a diagram for explaining the contents of a resource management table in the first embodiment;

FIG. 8 is a diagram for explaining the contents of a reservation resource management table in the first embodiment;

FIG. 13 is a diagram for explaining the contents of traffic control information in the first embodiment;

FIG. 21 is a diagram for explaining the contents of a resource management table in the second embodiment;

FIG. 29 shows a resource reservation request window;

FIG. 30 shows a communication destination template window;

FIG. 37 shows a resource reservation detail window;

FIG. 38 is a diagram showing a data format of the resource reservation request message;

DETAILED DESCRIPTION OF THE PREFERRED EMBODIMENTS

Embodiments of the invention will be described hereinbelow with reference to the drawings.

A first embodiment of the invention will be described.

Figure 1:
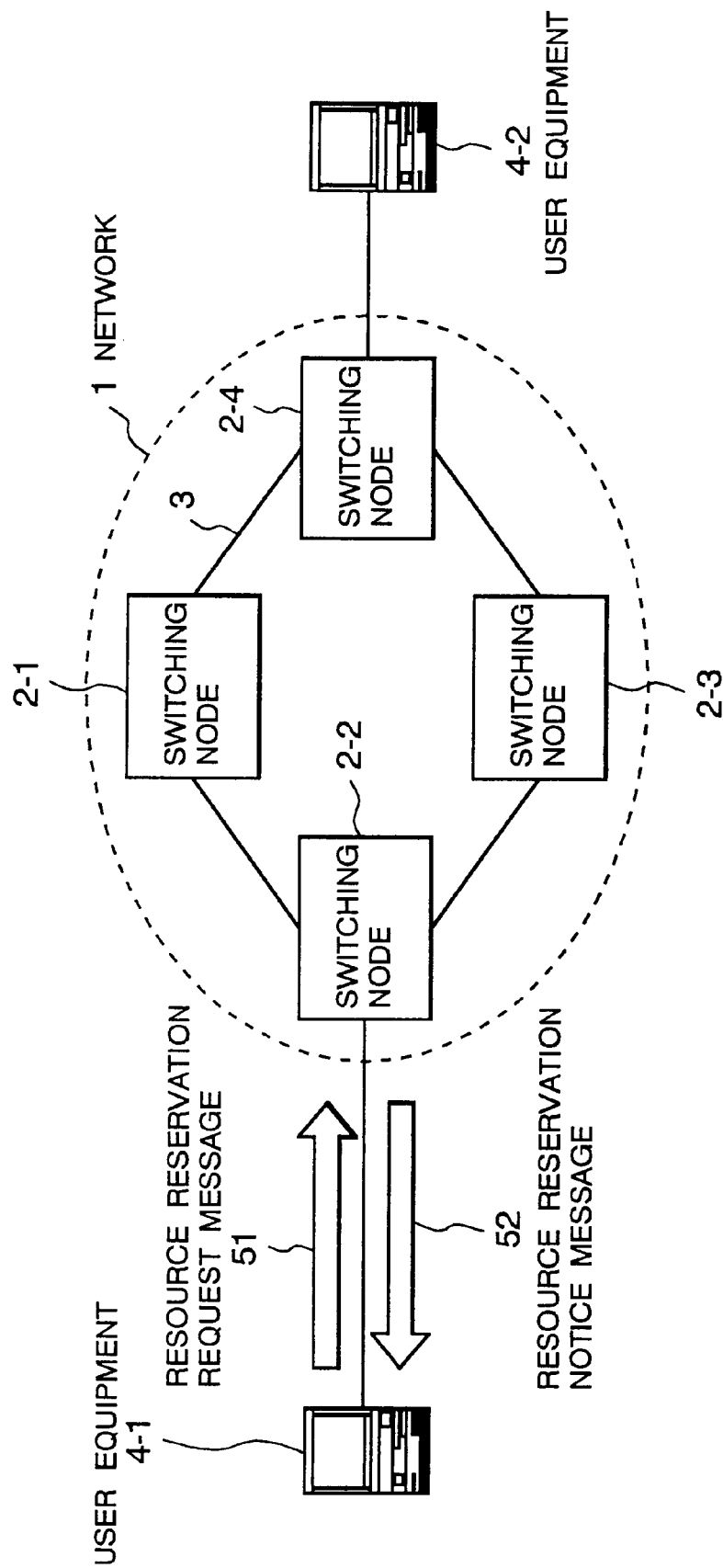
FIG. 1 is a diagram showing the whole construction of a network according to a first embodiment.

FIG. 1 is a diagram showing the whole construction of a network according to the first embodiment.

According to the example of FIG. 1, four switching nodes 2-1 to 2-4 are connected via a communication line 3 in a network 1. Specifically, each of the switching nodes 2-1 to 2-4 is a network device such as a router or an ATM switching device.

In the example of FIG. 1, two user terminals 4-1 to 4-2 are linked to the switching nodes 2-2 and 2-4, respectively. Each of the user terminals 4-1 and 4-2 is a network device of the user connected to the network 1. Although the user terminal is shown as a PC (Personal Computer) in FIG. 1, it can be a network device such as a router, an ATM switching device, or the like.

According to the first embodiment, with respect to each of resources, each of the switching nodes 2-1 to 2-4 manages time and reservation priority of a communication using the resource, thereby efficiently reserving the resource in response to a resource reservation request from each of the user terminals 4-1 and 4-2.

For example, when the user terminal 4-1 requests the network 1 to reserve a resource, as shown in FIG. 1, the user terminal 4-1 sends a resource reservation request message 51 to the network 1, the network 1 notifies the user terminal of a reservation result by sending a resource reservation result notice message 52 to the user terminal 4-1.

Figure 2:
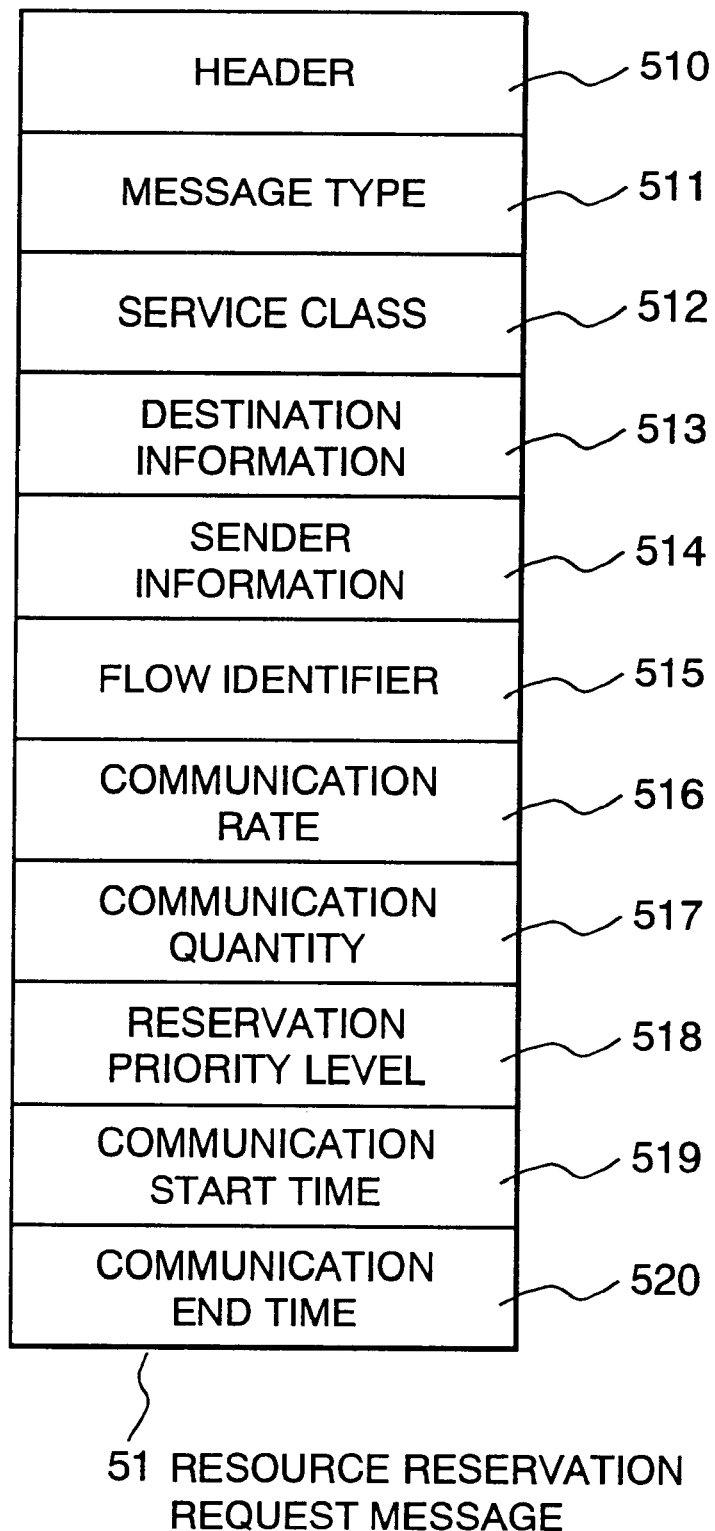
FIG. 2 is a diagram showing the structure of a resource reservation request message in the first embodiment.

FIG. 2 is a diagram showing the structure of the resource reservation request message 51. Fields 510 to 520 will be described hereinbelow.

(1) header 510 . . . a field in which control information indispensable for a packet as a basic unit of data transmitted in the network 1 is set and whose contents depend on the network 1.

(2) message type 511 . . . a field in which an identifier of the resource reservation request message 51 is shown.

(3) service class 512 . . . a field showing the service class requested by the user. The details of the service class 512 will be described hereinlater.

(4) destination information 513 . . . a field in which a destination user terminal is shown.

(5) sender information 514 . . . a field in which a transmission user terminal is shown.

(6) flow identifier 515 . . . a field showing an identifier of a communication in which reservation is performed. For example, when the network 1 employs the TCP/IP protocol, a set of transmission/reception IP addresses or a set of transmission/reception IP address and a TCP port number can be used as the flow identifier 515. Further, information at an application level can be also used.

(7) communication rate 516 . . . a field in which a communication rate (bits/sec, or the like) desired by the user is shown.

(8) communication quantity 517 . . . a field in which a communication quantity of a transfer data quantity (bits or the like) desired by the user is shown.

(9) reservation priority 518 . . . a field in which a reservation priority desired by the user is shown.

(10) communication start time 519 . . . a field in which communication start date and time desired by the user are shown.

(11) communication end time 520 . . . a field in which communication end date and time desired by the user are shown.

FIG. 3 is a diagram showing the structure of the resource reservation result notice message 52. Fields 521 to 530 will be described hereinbelow.

(1) header 521 . . . similar to the header 510 in the resource reservation request message 51.

(2) message type 522 . . . a field in which an identifier of the resource reservation result notice message 52 is shown.

(3) service class 523 . . . similar to the service kind 512 in the resource reservation request message 51.

(4) destination information 524 . . . similar to the destination information 513 in the resource reservation request message 51.

(5) sender information 525 . . . similar to the sender information 514 in the resource reservation request message 51.

(6) flow identifier 526 . . . similar to the flow identifier 515 in the resource reservation request message 51.

(7) reservation result 527 . . . a field in which success/failure of the resource reservation is shown. Further, when the reservation is failed, the reason is also set.

(8) communication rate 528 . . . a field showing a communication rate (bits/sec, or the like) guaranteed by the network 1.

(9) communication start time 529 . . . a field showing date and time of the start of guarantee when the network 1 starts to guarantee the communication at the communication rate 528.

(10) communication end time 530 . . . a field showing date and time of the end of guarantee when the network 1 finishes guaranteeing the communication at the communication rate 528.

In the first embodiment, by exchanging the resource reservation message 51 and the resource reservation result notice message 52 with the user terminals 4-1 and 4-2, the network 1 can provide various services regarding the resource reservation to the user terminals 4-1 and 4-2.

A specific example of the service class will be described hereinbelow with reference to FIG. 4.

FIG. 4 is a diagram showing a specific example of service classes.

In the example of FIG. 4, the services provided by the network 1 are divided into five service classes of "A", "A–", "B", "B–", and "C" as shown by reference numerals 70 to 74. The costs of each of the service classes charged to the user are set to be "A">"A–">"B">"B–">"C".

(1) the contents of service in the service class "A" or "A–".

Service when the service class is "A" or "A–" is the service for guaranteeing the communication at a communication rate desired by the user at a time desired by the user, which is suitable for a communication requiring a real-time performance such as a television conference whose holding time is preliminarily known.

In order to receive the service of the service class, each of the user terminals 4-1 and 4-2 transmits the resource reservation request message 51 in which at least the data except for the communication quantity 517 is set. Especially, the service class is set in the service class 512, the communication rate desired by the user is set in the communication rate 516, and date and time of a communication start and date and time of a communication end desired by the user are set in the communication start time 519 and the communication end time 520. In case of "A", "priority" is set in the reservation priority 518. In case of "A–", "non-priority" is set.

Although two service classes "A" and "A–" are prepared according to either "priority" or "non-priority" of the reservation priority in the example, three or more kinds of service classes can be also prepared according to the reservation priorities which are further minutely provided.

(2) the contents of services when the service classes are "B" and "B–"

The service of the service classes "B" and "B–" are the service for guaranteeing a communication of a communication quantity desired by the user and is suitable for a communication which does not require the real-time performance such as a file transfer for transferring a file of a predetermined data amount.

In order to receive the service of the service class "B" or "B–", each of the user terminals 4-1 to 4-2 sends the resource reservation request message in which at least the data except for the communication rate 516 is set. Especially, this service class is set in the service class 512. A communication quantity desired by the user is set in the communication quantity 517. The communication start date and time and communication end date and time which are desired by the user are set in the communication start time 519 and the communication end time 520. In case of "B", "priority" is set in the reservation priority 518. In case of "B–", "non-priority" is set.

Since the service of the service class "B" or "B–" is the service adapted to a communication which does not require the real-time performance, the communication start date and time and the communication end date and time set in the communication start time 519 and the communication end time 520 do not show strict communication time but show flexible communication time.

That is, for example, when the user transfers a file of a predetermined amount of data, a time zone (permissible time range of the communication time) during which the file is transferred is designated by the communication start time 519 and the communication end time 520.

According to the first embodiment, in case of providing the service of the service class "B" or "B–", the network 1 allocates proper communication time and communication rate. Preferably, the network 1 allocates proper communication time, for instance, in a time zone where there are many empty resources according to the present reservation state or in a time zone such as night time in which the resource activity rate is low according to a past statistic.

Consequently, the service at low costs can be provided to the users.

Although the two service classes "B" and "B–" are prepared according to whether the reservation priority is "priority" or "non-priority" in the embodiment, three or more service classes can be also prepared for reservation priorities which are more minutely provided.

(3) The contents of service of the service class "C".

Service of the service class "C" is the service (best effort service) in which nothing is guaranteed to the user. Consequently, the user does not have to reserve resources.

By using resources which are not used in the communications receiving the services of (1) and (2), services can be cheaply provided to the user.

Figure 5:
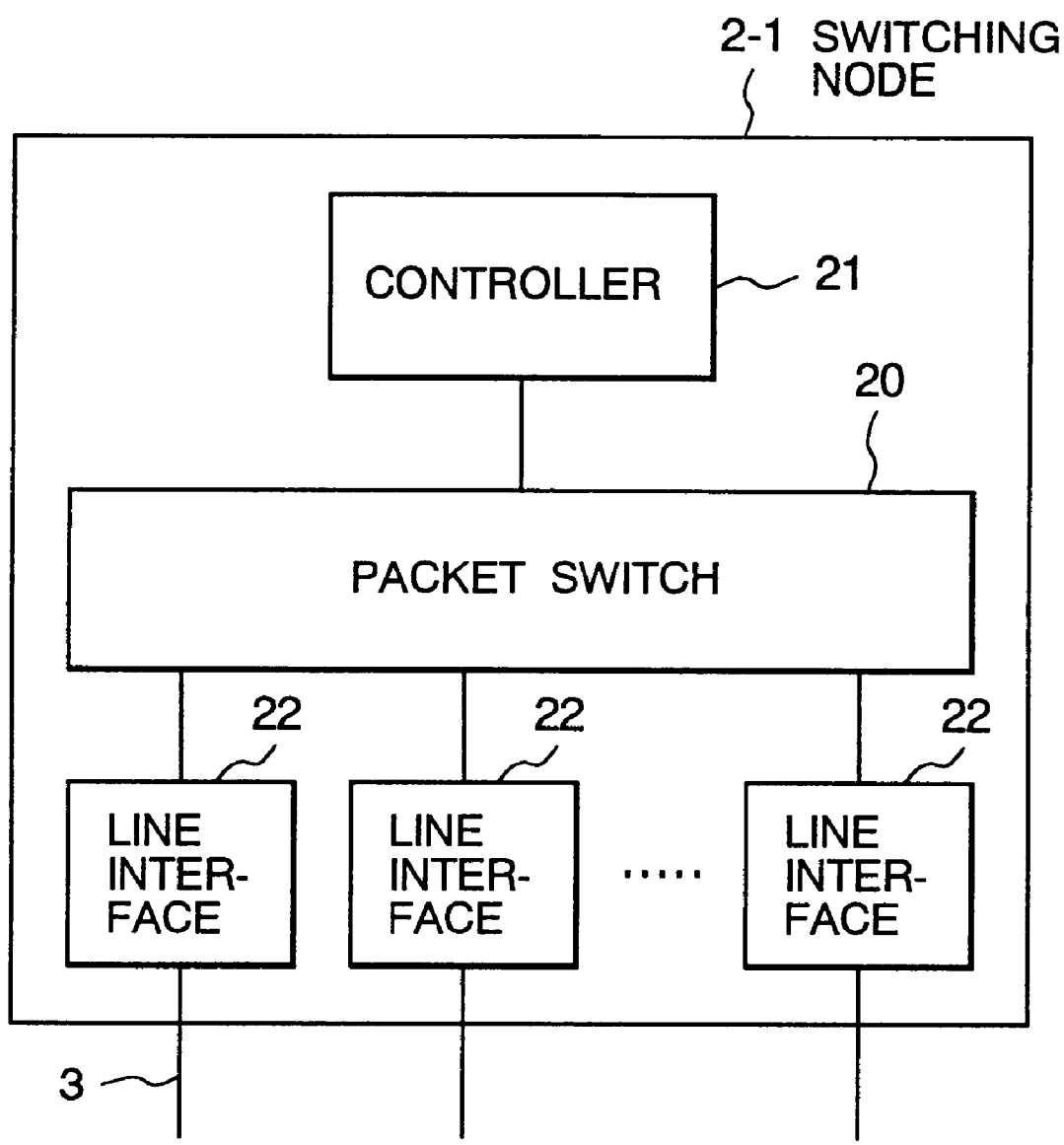
FIG. 5 is a diagram showing the internal construction of a switching node in the first embodiment.

FIG. 5 is a diagram showing the internal structure of the switching node 2-1.

As shown in FIG. 5, the switching node 2-1 comprises a packet switch 20 for switching packets, a plurality of line interfaces 22 for connecting the communication lines and the packet switch 20, and a controller 21. The plurality of line interfaces 22 and the controller 21 are connected to each other by the packet switch 20.

The internal structure of each of the other switching nodes 2-2 to 2-4 is similar to that of FIG. 5.

Figure 6:
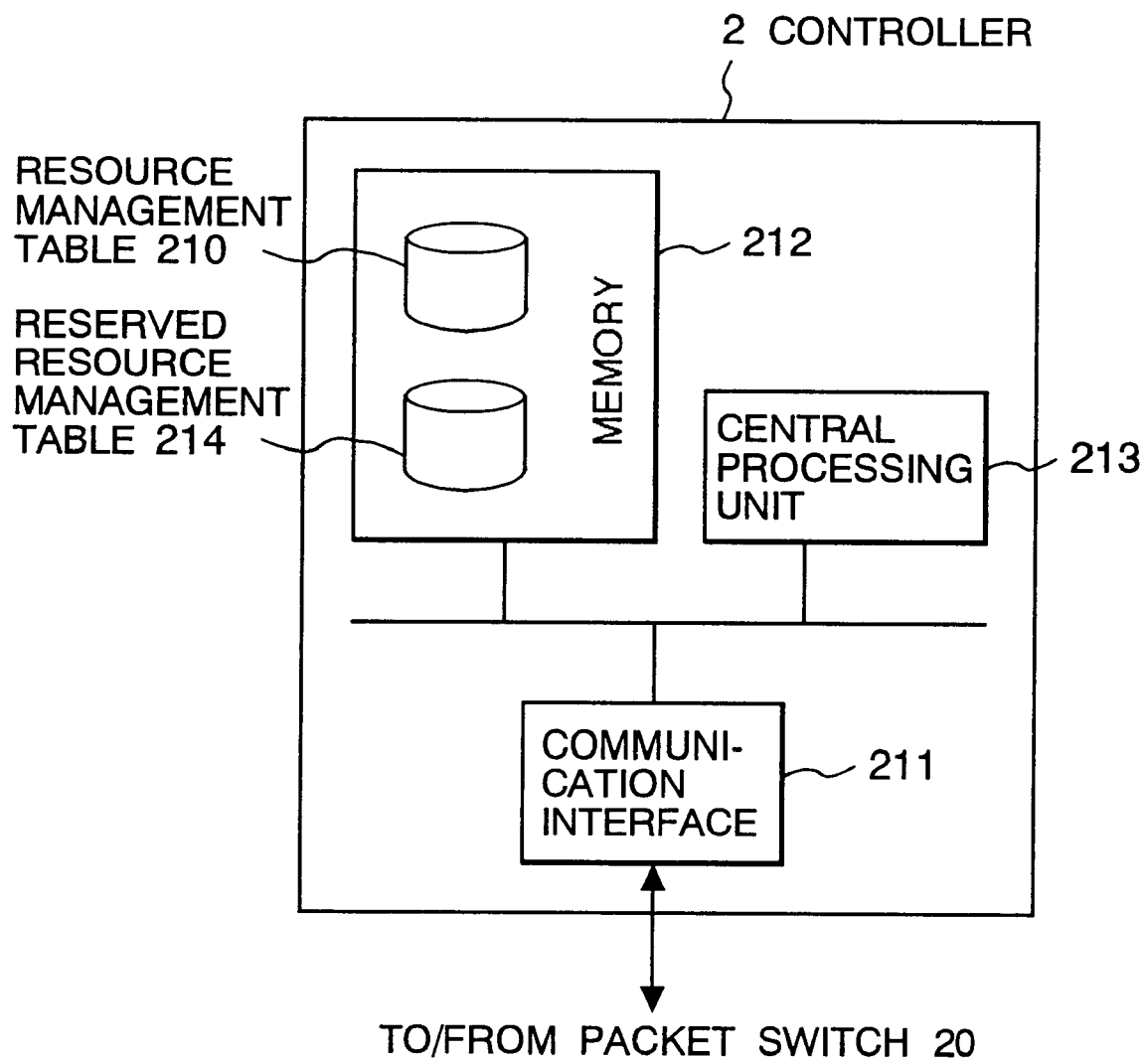
FIG. 6 is a diagram showing the internal construction of a controller of the switching node in the first embodiment.

FIG. 6 is a diagram showing the internal structure of the controller 21.

As shown in FIG. 6, the controller 21 comprises a communication interface 211 for connecting an internal bus with the packet switch 20, a memory 212 connected to the internal bus, and a CPU 213. A resource management table 210 and a reserved resources management table 214 are stored in the memory 212.

FIG. 7 is a diagram for explaining the contents of the resource management table 210.

The resource management table 210 is the table for managing the type and the quantity of a resource which can be reserved by the switching node 2-1, that is, the type and the quantity of a resource which can be used by the self switching node.

As shown in FIG. 7, a line capacity of each of an incoming line and an outgoing line is stored in the resource management table 210.

The contents of the resource management table 210 are preset by the net manager or the like.

FIG. 8 is a diagram for explaining the contents of the reserved resources management table 214.

The reserved resources management table 214 is the table for managing a reserved resource of each flow by the self switching node.

As shown in FIG. 8, in the reserved resources management table 214, a flow identifier, a reversed communication band, an incoming line interface number, an outgoing line interface number, destination information, sender information, reserved communication time, and reservation priority are stored every flow of the reserved resource.

In FIG. 8, for example, the first entry in the reserved resources management table 214 shows a reservation such that reserved communication time is from 13:00 on Jan. 29, 1997 to 15:00 on Jan. 29, 1997, the incoming line of the line interface 22 of the incoming line interface number of "1" and the outgoing line of the line interface 22 of the outgoing line interface number of "2" are used, and the communication rate of "64 kbps" is guaranteed as a reservation band, and the reservation has the "priority" in the reservation priority for the "flow a" a communication from the "user terminal 4-1" as a transmission user terminal to the "user terminal 4-2" as a destination user terminal.

The operation of the switching nodes 2-1 to 2-4 for forming the reserved resources management table 214, that is, the operation of the switching nodes 2-1 to 2-4 for reserving a resource will be described hereinbelow with reference to the flowchart of FIGS. 9 to 11.

The switching node which has received the resource reservation request message 51 transfers the resource reservation request message 51 to the controller 21 via the line interface 22 and the packet switch 20.

Figure 9:
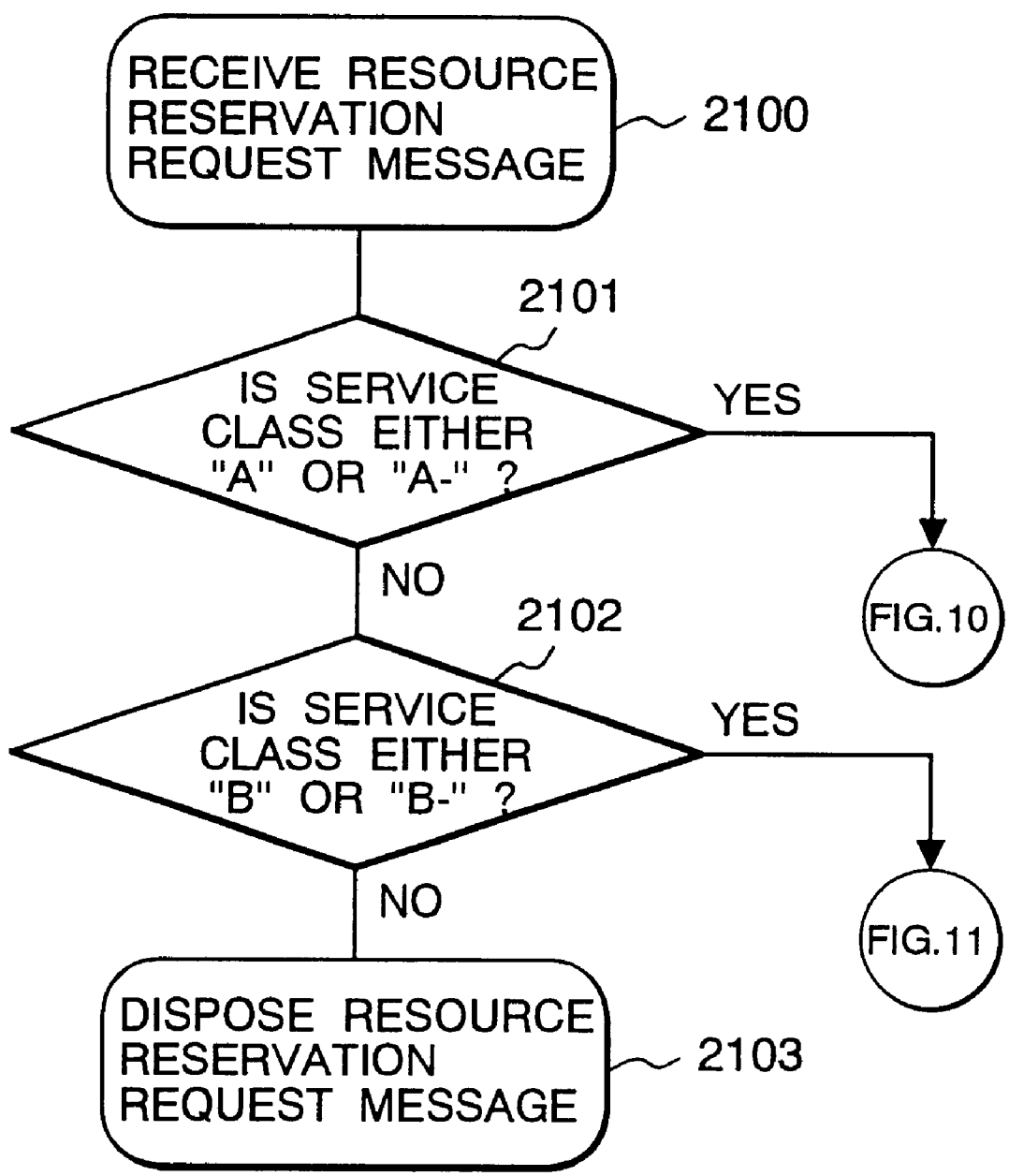
FIG. 9 is a flowchart showing the flow of a resource reserving operation of the switching node in the first embodiment.

When the controller 21 receives the resource reservation request message 51, as shown in FIG. 9, the controller 21 confirms that the message is the resource reservation request message 51 by the message type 511 in the resource reservation request message 51 (step 2100).

Subsequently, the controller 21 discriminates whether the service class is "A" or "A-" by the service class 512 in the received resource reservation request message 51 (step 2101). If the service class is "A" or "A-", a process shown by the flowchart of FIG. 10 is performed.

When the service class is not "A" or "A-", it is discriminated whether the service class is "B" or "B-" (step 2102). If the service class is "B" or "B-", a process shown by the flowchart of FIG. 11 is executed.

Since only those service classes require the resource reservation in the first embodiment, if the service class is not any one of "A", "A-", "B", and "B-", the controller 21 disposes the resource reservation request message 51 (step 2103).

A process in the case where the service class is "A" or "A-" will be first described with reference to the flowchart of FIG. 10.

Figure 10:
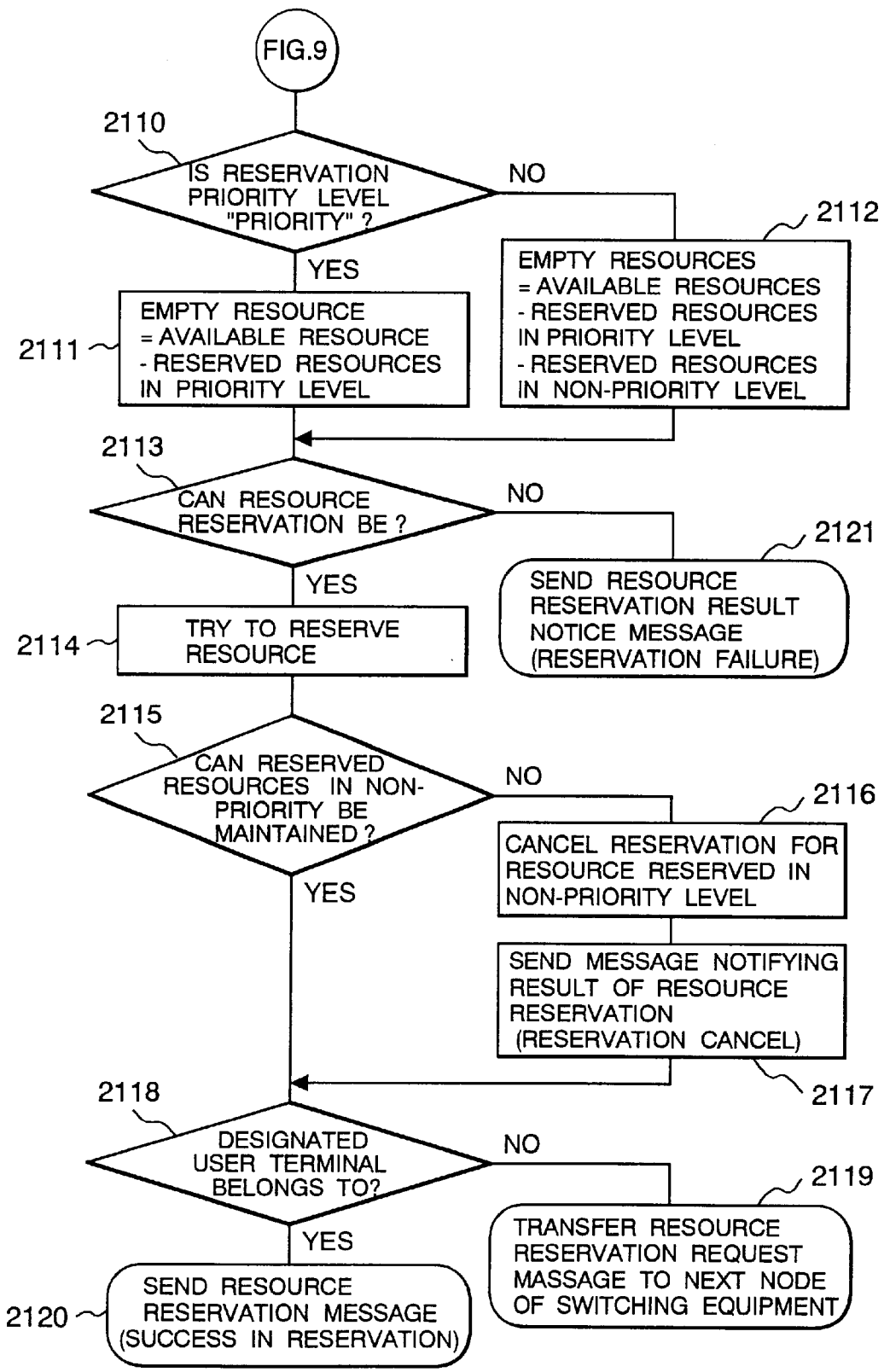
FIG. 10 is a flowchart showing the flow of a resource reserving operation of the switching node in the first embodiment.

When it is discriminated that the service class is "A" or "A-", as shown in FIG. 10, the controller 21 checks a reservation priority 218 in the received resource reservation request message 51 (step 2110). In case of "priority", empty resources are obtained by subtracting resources (reserved resources having the priority) with the reservation priority of "priority" stored in the reserved resources management table 214 from resources (available resources) stored in the resource management table 210, the controller 21 obtains empty resources (step 2111).

When the reservation priority 218 in the received resource reservation request message 51 is "non-priority", by subtracting all of resources (reserved resources having the priority and reserved resources without priority) stored in the reserved resources management table 214 from resources (available resources) stored in the resource management table 210, the controller 21 obtains empty resources (step 2112).

After that, the controller 21 discriminates whether a resource can be reserved at a communication time shown by the communication start time 519 and the communication end time 520 in the received resource reservation request message 51 from the empty resources obtained in step 2111 or 2112 (step 2113).

If it is determined that the resource can be reserved, in order to reserve the resource, the entry regarding the flow identifier 515 in the resource reservation request message 51 is registered in the reserved resources management table 214 (step 2114).

In this instance, since the resource reservation is performed on the basis of the resource reservation request message 51 in which the reservation priority 518 is "priority", there may be a reserved resource which does not have the priority and cannot be maintained to be reserved. In such a case (step 2115), by eliminating the relevant entry in the reserved resources management table 214 with respect to the reserved resources having the priority, the reservation in the self switching node is cancelled (step 2116) and the resource reservation result notice message 52 in which the cancellation of the reservation by the reservation having the priority is set in the reservation result 527 is sent to the transmission user terminal and the destination user terminal of the communication in which the reservation is cancelled (step 2117).

When the transmission user terminal and the destination user terminal are not linked to the self switching node, the resource reservation result notice message 52 is transferred to each of the transmission user terminal and the destination user terminal via one or more other switching nodes. In the switching node through which the resource reservation result notice message 52 is sent, by deleting the relevant entry in the reserved resources management table 214 in the self switching node in accordance with the resource reservation result notice message 52, the reservation in the self switching node is cancelled.

When the destination user terminal indicated by the destination information 513 in the received resource reservation request message 51 is linked to the self switching node (step 2118), the controller 21 sends the resource reservation result notice message 52 in which the success of reservation is set in the reservation result 527 to the transmission user terminal which has sent the resource reservation request message 51 (step 2120).

In the case where the transmission user terminal is not linked to the self switching node, the resource reservation result notice message 52 is transferred to the transmission user terminal via one or more other switching nodes. That is, when the transmission user terminal is not linked to the self switching node, the resource reservation request message 51 is transferred via one or more other switching nodes. Consequently, the controller 21 transmits the resource reservation result notice message 52 to the other switching node which has transferred the resource reservation request message 51 to the self switching node.

When the destination user terminal indicated by the destination information 513 in the received resource reservation request message 51 is not linked to the self switching device (step 2118), the controller 21 transfers the resource reservation request message 51 to the switching node as the next node on the communication path to the destination user terminal (step 2119).

On the other hand, when it is discriminated that the resource cannot be reserved in the communication time shown by the communication start time 519 and the communication end time 521 in the received resource reservation request message 51 from the empty resources obtained in step 2111 or 2112 (step 2113), the controller 21 sends the resource reservation result notice message 52 in which the failure of reservation due to no empty resource is set in the reservation result 527 to the transmission user terminal which has sent the resource reservation request message 51 (step 2121).

In the case where the transmission user terminal is not linked to the self switching node, the resource reservation result notice message 52 is transferred to the transmission user terminal via one or more other switching nodes. That is, when the transmission user terminal is not linked to the self switching node, the resource reservation request message 51 is transferred via one or more other switching nodes. Consequently, the controller 21 transfers the resource reservation result notice message 52 to the other switching node which has transferred the resource reservation request message 51 to the self switching node. In the switching node through which the resource reservation result notice message 52 is sent, by eliminating the relevant entry in the reserved resources management table 214 of the self switching node in accordance with the resource reservation result notice message 52, the reservation in the self switching node is cancelled.

The process when the service class is either "B" or "B–" will be described with reference to the flowchart of FIG. 11.

Figure 11:
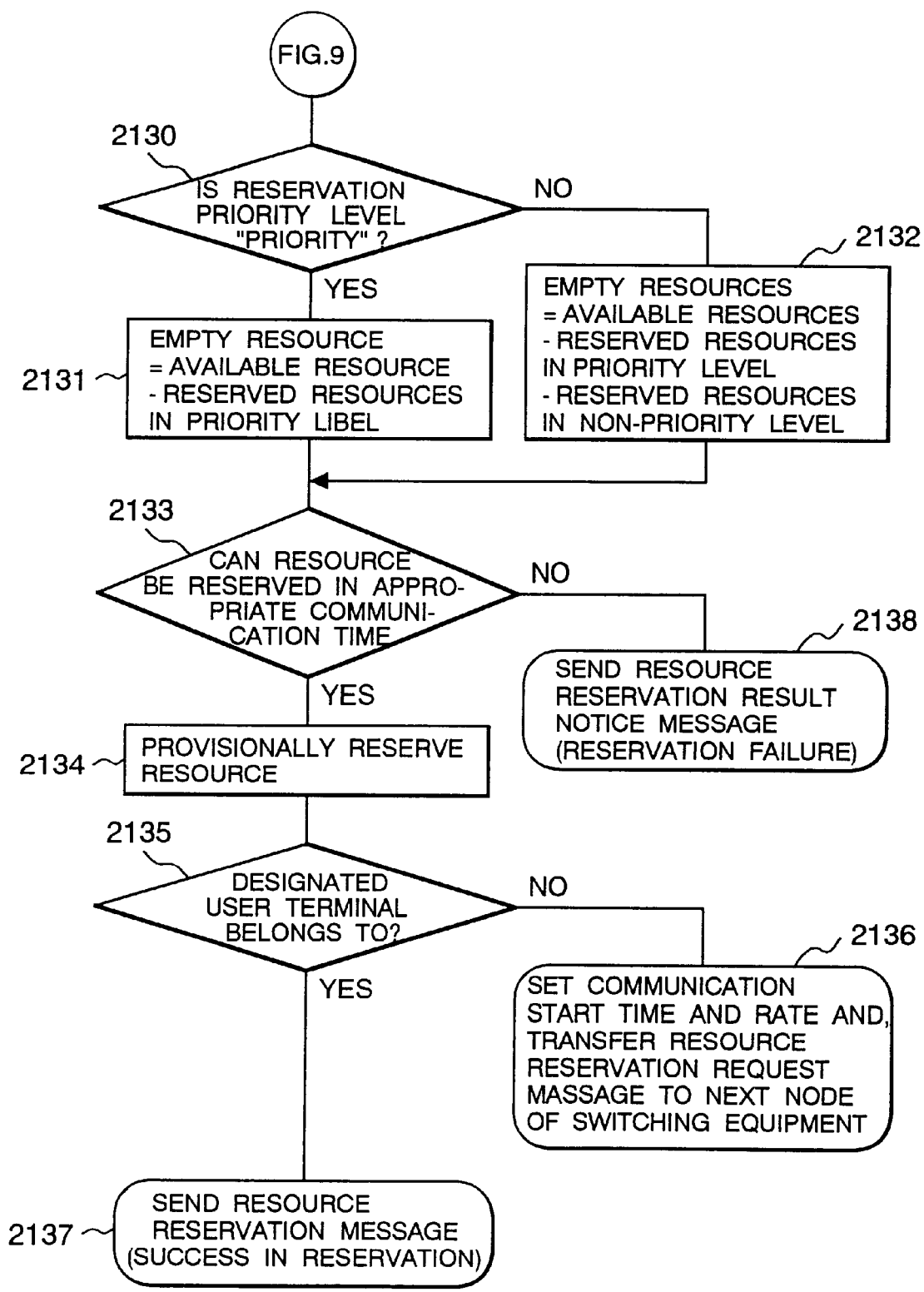
FIG. 11 is a flowchart showing the flow of a resource reserving operation of the switching node in the first embodiment.

When it is discriminated that the service class is either "B" or "B–", as shown in FIG. 11, the controller 21 obtains empty resources (steps 2130 to 2132) in a manner similar to the case where the service class is either "A" or "A–".

In the first embodiment, when the service class is "B" or "B–", communication start date and time and communication end date and time showing flexible communication time (time zone) are set in the communication start time 519 and the communication end time 520.

The controller 21 therefore discriminates whether or not appropriate communication time can be allocated to the time zone shown by the communication start time 519 and the communication end time 520 in the received resource reservation request message 51 with respect to the empty resources obtained in step 2131 or 2132 (step 2133).

From the viewpoint of reduction in communication costs, the controller 21 allocates the appropriate communication time, for example, to a time zone having many empty resources according to the present reservation situation or a time zone such as night time having a low resource activity ratio according to past statistics.

When a communication rate is set in the communication rate 516 in the received resource reservation request message 51, the controller 21 has to allocate a communication rate lower than the set communication rate. As will be described hereinlater, the communication rate 516 is set by the switching node for relaying the resource reservation request message 51.

Subsequently, when it is discriminated that the appropriate communication time can be allocated (step 2133), since it denotes that the resource can be reserved at the communication time, the controller 21 provisionally registers an entry with respect to the flow identifier 515 in the resource reservation request message 51 in the reserved resources management table 214 in order to provisionally reserve the resource (step 2134).

In the case where the destination user terminal shown by the destination information 513 in the received resource reservation request message 51 is not linked to the self switching node (step 2135), the controller 21 transfers the resource reservation request message 51 to the next switching node on the communication path to the destination user terminal (step 2119).

In this instance, after setting again communication time which can be allocated by the self switching node into the communication start time 519 and the communication end time 520 in the received resource reservation request message 51 and setting again the highest communication rate at which communication can be performed at the communication time, the controller 21 transfers the resource reservation request message 51.

As mentioned above, the communication time and the communication rate can be flexibly allocated in the switching node to which the destination user terminal is not linked, that is, the switching node for relaying the resource reservation request message 51. Specifically, the product of time corresponding to the communication time and the communication rate can be set larger than the communication quantity 517 in the received resource reservation request message 51, thereby increasing the degree of freedom of the resource reservation in the switching node for relaying the resource reservation request message 51.

When the destination user terminal indicated by the destination information 513 in the received resource reservation request message 51 is linked to the self switching node (step 2135), the controller 21 allocates the communication rate so that the product of the time corresponding to the communication time and the communication rate is equal to the communication quantity 517 in the resource reservation request message 51, the communication rate is set to the communication rate 528, the communication time which can be allocated in the self switching node is set in the communication start time 529 and the communication end time 530, and the resource reservation result notice message 52 in which the success of reservation is set in the reservation result 527 to the transmission user terminal which has transmitted the resource reservation request message 51 (step 2137).

In the case where the transmission user terminal is not linked to the switching node, the resource reservation result notice message 52 is transferred to the transmission user terminal via one or more other switching nodes. That is, when the transmission user terminal is not linked to the self switching node, the resource reservation request message 51 is transferred via one or more other switching nodes. Consequently, the controller 21 transmits the resource reservation result notice message 52 to the other switching node which has transferred the resource reservation request message 51 to the self switching node.

The operation of the switching node which received the resource reservation result notice message 52 will be described hereinlater with reference to the flowchart of FIG. 12.

On the other hand, when it is discriminated that the appropriate communication time cannot be allocated (step 2133), since it denotes that the resource cannot be reserved at the communication time, the controller 21 sends the resource reservation result notice message 52 in which the failure of reservation due to no empty resource is set in the reservation result 527 to the transmission user terminal which has transmitted the resource reservation request message 51 (step 2138).

When the transmission user terminal is not linked to the self switching node, the resource reservation result notice message 52 is transferred to the transmission user terminal via one or more other switching nodes. That is, when the transmission user terminal is not linked to the self switching node, the resource reservation request message 51 is transferred via one or more other switching nodes. Consequently, the controller 21 sends the resource reservation result notice message 52 to the other switching node which has transferred the resource reservation request message 51 to the self switching node. In the switching node through which the resource reservation result notice message 52 is sent, by eliminating the relevant entry in the reserved resources management table 214 of the self switching node in accordance with the resource reservation result notice message 52, the provisional reservation in the self switching node is cancelled.

The operation of each of the switching nodes 2-1 to 2-4 which received the resource reservation result notice message 52 transmitted in step 2137 in FIG. 11 will be described hereinbelow with reference to the flowchart of FIG. 12.

As mentioned above, the resource reservation result notice message 52 transmitted in step 2137 of FIG. 11 is sent against the communication path in which the resource is reserved and is returned to the transmission user terminal.

Each of the switching nodes 2-1 to 2-4 which has received the resource reservation result notice message 52 transfers the resource reservation result notice message 52 to the controller 21 via the line interface 22 and the packet switch 20.

Figure 12:
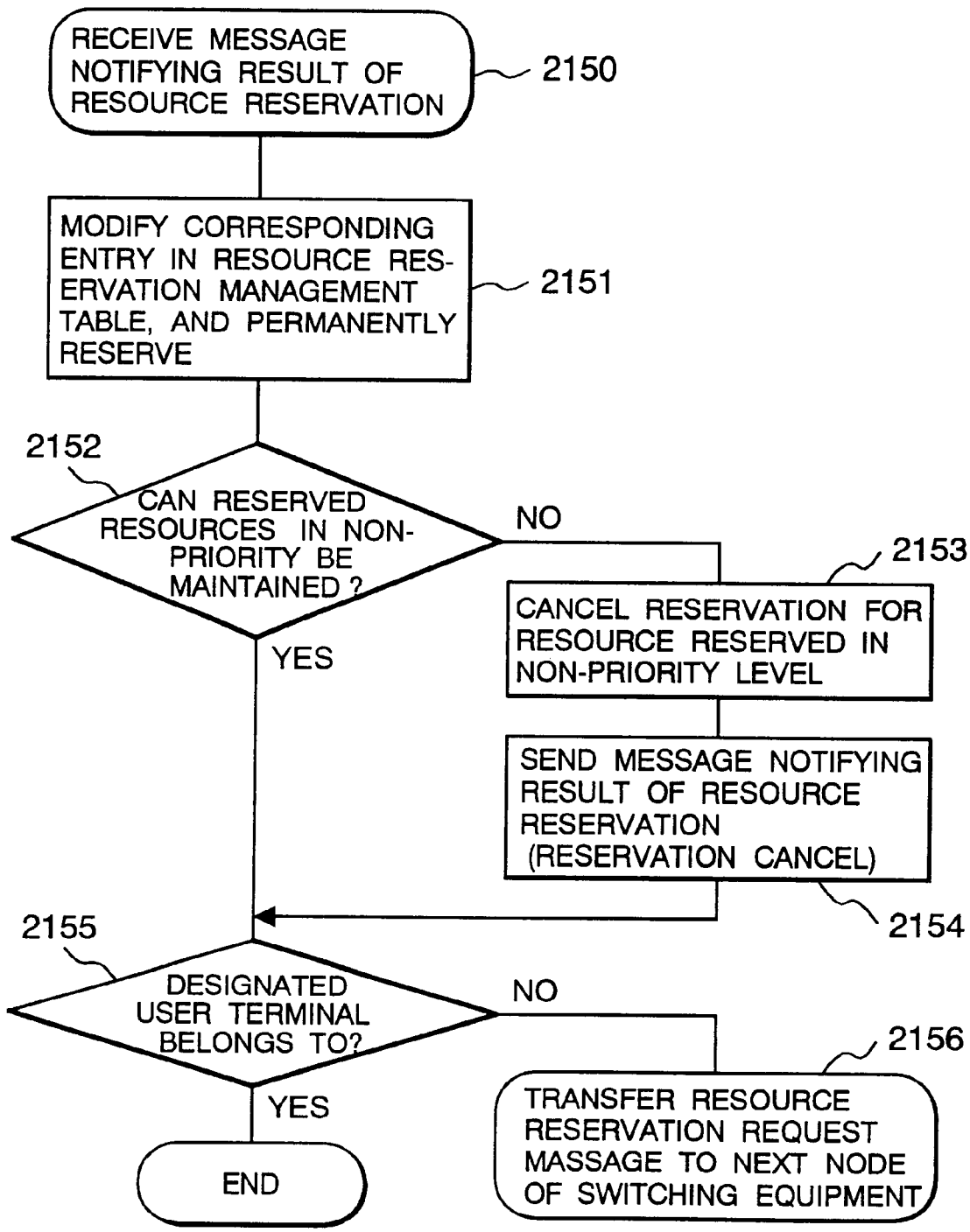
FIG. 12 is a flowchart showing the flow of an operation performed by the switching node when the resource reservation result notice message indicating that a reservation has been succeeded is received in the first embodiment.

When the resource reservation result notice message 52 is received, as shown in FIG. 12, the controller 21 recognizes that it is the resource reservation result notice message 52 in which the reservation of the resource used for a communication to receive the service in the service class "B" or "B–" is succeeded by the message type 522, the service class 523, and the reservation result 527 in the resource reservation result notice message 52 (step 2150).

By correcting the relevant entry which is provisionally registered in the reserved resources management table 214 in accordance with the communication rate 528, the communication start time 529, and the communication end time 530 in the received resource reservation result notice message 52, the controller 21 formally reserves the provisionally reserved resource (step 2151).

In this instance, there may be a reserved resource having no priority which cannot be maintained to be reserved since the resource is formally reserved on the basis of the resource reservation request message 51 in which the reservation priority 518 is "prior". In such a case (step 2152), in a manner similar to the case where the service class is either "A" or "A–", by eliminating the relevant entry in the reserved resources management table 214 with respect to the reserved resource having no priority, the reservation in the self switching node is cancelled (step 2153) and the resource reservation result notice message 52 in which the cancellation of reservation by the reservation having the priority is set in the reservation result 527 is sent to the transmission user terminal and the destination user terminal of the communication in which the reservation is cancelled (step 2154).

In the case where the transmission user terminal and the destination user terminal are not linked to the self switching node, the resource reservation result notice message 52 is transferred to each of the transmission user terminal and the destination user terminal via one or more other switching nodes. In the switching node through which the resource reservation result notice message 52 is sent, by eliminating the relevant entry in the reserved resources management table 214 of the self switching node in accordance with the resource reservation result notice message 52, the reservation in the self switching node is cancelled.

When the transmission user terminal shown by the sender information 525 in the received resource reservation result notice message 52 is not linked to the self switching node (step 2155), the controller 21 transmits the resource reservation result notice message 52 in which the success of reservation is set in the reservation result 527 to the other switching node which has transferred the resource reservation request message 51 to the self switching node (step 2156).

As mentioned above, according to the network 1 of the first embodiment, resources which will be used in a future communication can be reserved.

Especially, by giving the reservation priority, an important communication can be preferentially reserved.

Especially, by allocating the appropriate communication time in the network 1 with respect to a communication which does not require a real-time performance, the resource can be effectively used and low-cost services can be provided to the user.

Although one appropriate communication time is allocated in the process where the service class is "B" or "B–" in the first embodiment, it is also possible that a plurality of communication times are allocated in a time zone designated by the user and data of a transfer data amount desired by the user is dividedly transferred at the communication times.

In the first embodiment, with respect to the communication which does not need a reservation of a resource, that is, communication receiving the service in the service class "C", the resource used for the communication is assured at the start time point of the communication in a manner similar to the conventional technique. In this instance, however, the empty resources except for the reserved resources are allocated as resources used for the communication.

Further, according to the first embodiment, each of the switching nodes 2-1 to 2-4 can perform the traffic control on the basis of the reserved resources management table 214 formed as mentioned above. The operation of each of the switching nodes 2-1 to 2-4 in such a case will be described hereinbelow with reference to FIGS. 13 and 14.

In each of the switching nodes 2-1 to 2-4, the controller 21 generates traffic information of the communication (flow) of which reserved communication start time has come on the basis of the reserved resources management table 214 and outputs the information to the relevant line interface 22.

FIG. 13 is a diagram illustrating the contents of the traffic control information.

As shown in FIG. 13, the traffic control information 220 is constructed by the flow identifier, the reservation band and the outgoing line interface number.

Figure 14:
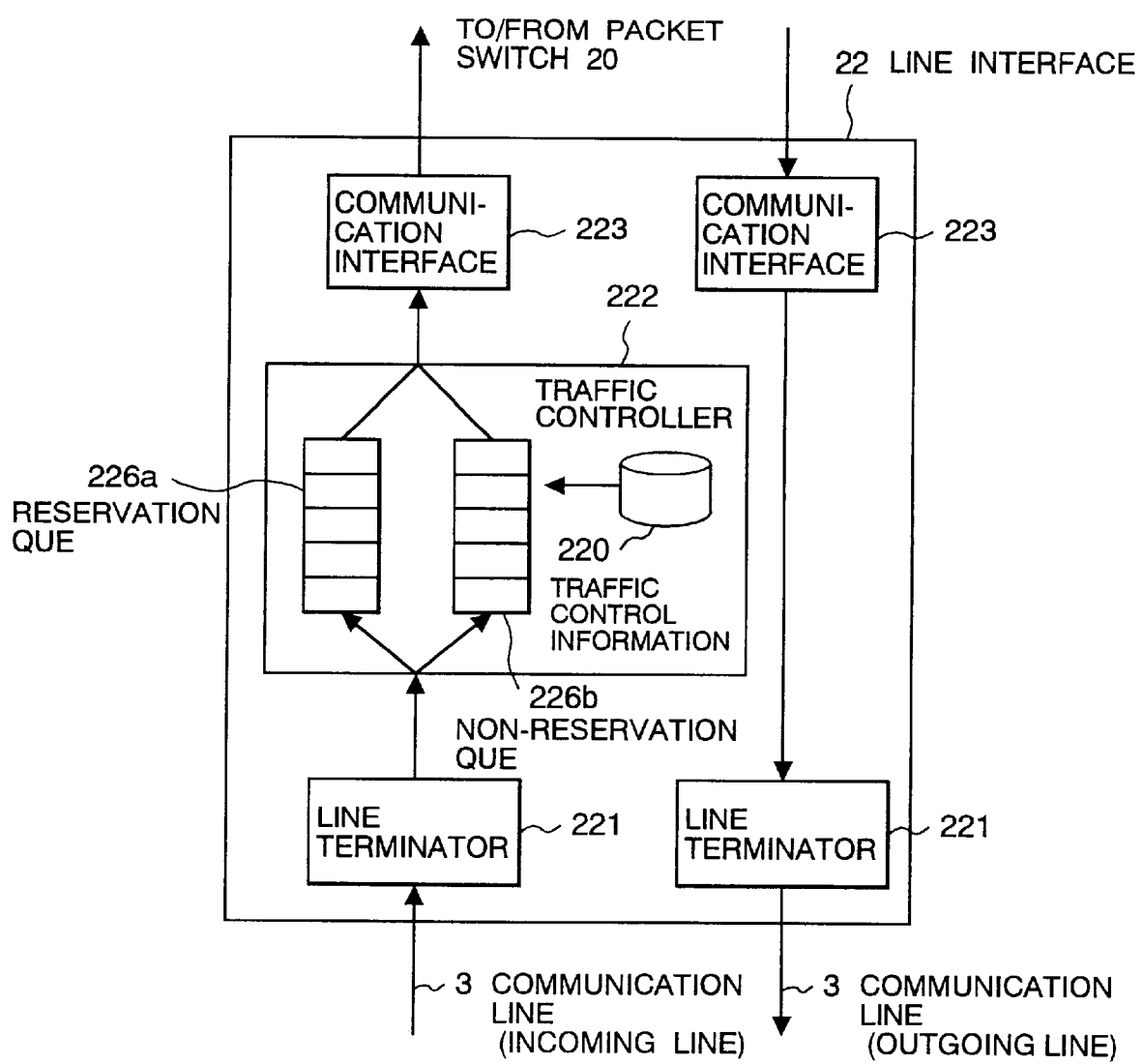
FIG. 14 is a diagram of the internal construction of a circuit interface in the first embodiment.

FIG. 14 is a diagram showing the internal structure of the line interface 22.

In the example of FIG. 14, the communication line 3 is shown by two lines of an incoming line and an outgoing line.

As shown in FIG. 14, the line interface 22 comprises line terminators 221 for terminating the communication lines 3, a traffic controller 222 for controlling the traffic, and communication interfaces 223 for connecting the line interface 22 and the packet switch 20.

The traffic controller 222 is positioned between the line terminator 221 of the incoming line and the communication interface 223. The traffic controller 222 controls the traffic on the basis of the traffic control information 220 and selects the outgoing line of the line interface 22.

That is, a packet sent from the communication line 3 is supplied to the traffic controller 222 via the line terminator 221 of the incoming line.

The traffic controller 222 has two ques of a reservation que 226a and a non-reservation que 226b. A packet belonging to a flow whose entry exists in the traffic control information 220, that is, a flow in which the resource is reserved at the present time is stored in the reservation que 226a until the reserved band is obtained. A packet belonging to a flow whose entry does not exist in the traffic control information 220, that is, a flow in which a resource is not reserved at the present time is stored into the non-reservation que 226b.

The traffic controller 222 preferentially transfers the packet stored in the reservation que 226a to the packet switch 20 via the communication interface 223, thereby enabling the packet belonging to the flow of the communication in which the resource has been reserved to be preferentially transferred within the reserved resources. That is, the communication in the reserved band can be guaranteed.

The packet transmitted from the reservation que 226a is switched by the packet switch 20 to the outgoing line of the line interface 22 indicated by the resource control information 220. The packet switched to the outgoing line of the line interface 22 is sent to the communication line 3 via the communication interface 223 and the line terminator 221 of the line interface 22.

Since the resource which will be used in a future communication is reserved in the first embodiment, there is a case such that the state of the network 1 is changed by a line failure, a failure in the switching node, or the like until the time when the resource is actually used.

In the case where the reserved resource cannot be used by a failure, the resource can be reserved again in the network 1 without letting the user know the failure. The operation of the switching nodes 2-1 to 2-4 in such a case will be described hereinbelow with reference to FIGS. 15 to 17.

Figure 15:
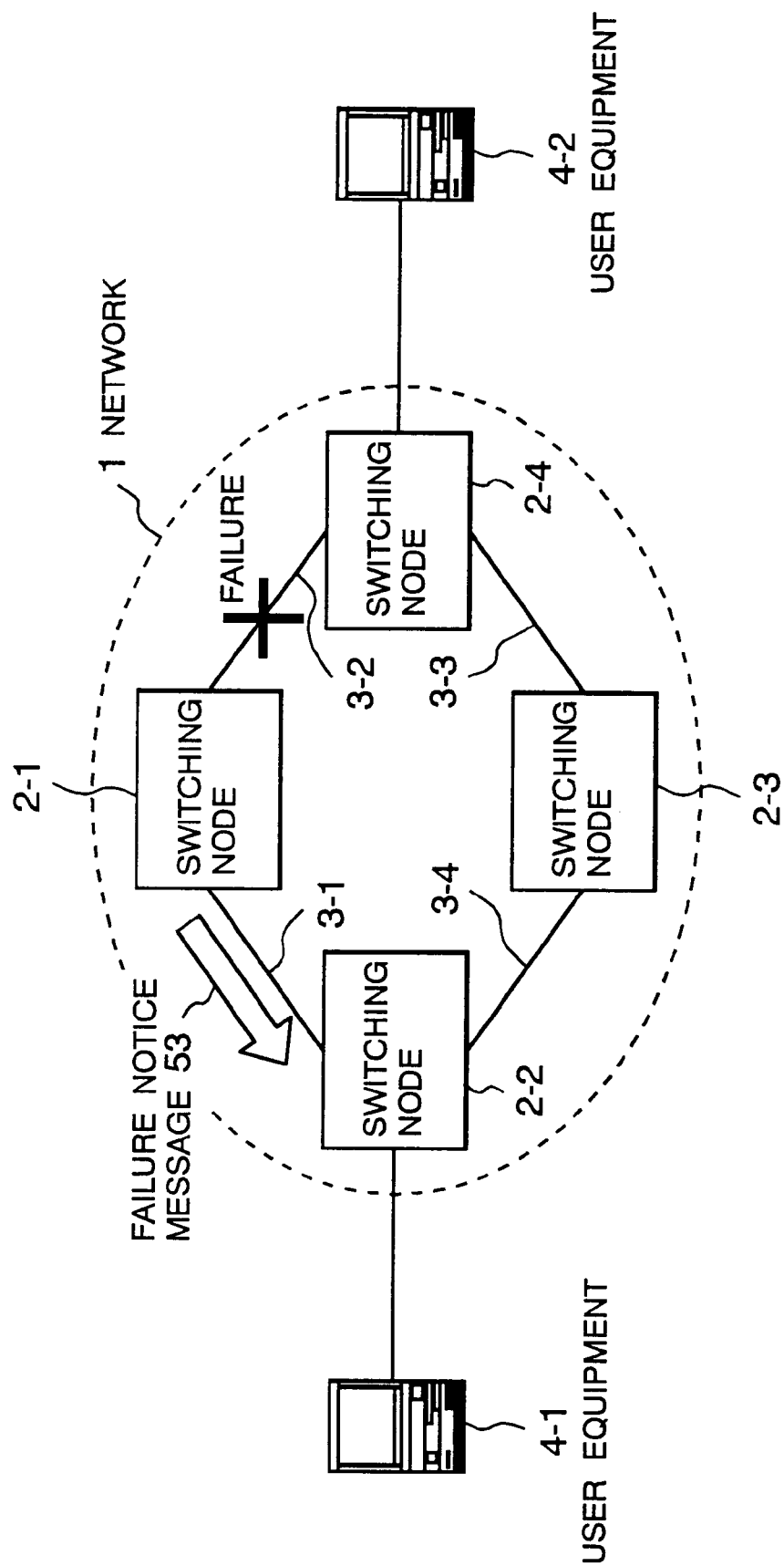
FIG. 15 is a diagram for explaining an example of a failure occurred in the network according to the first embodiment.

FIG. 15 is a diagram for illustrating an example of a failure occurred in the network 1.

FIG. 15 shows an example where a failure occurred in a communication line 3-2 in a state where the switching node 2-1 holds the reservation with respect to the flow using the resource of the communication line 3-2.

When the failure in the communication line 3-2 is detected, the switching node 2-1 sends a failure notice message 53 via the reserved communication path of the communication shown by the flow using the resource of the communication line 3-2.

In detail, the switching node 2-1 refers to the entry in the reserved resources management table 214 with respect to the flow using the resource of the communication line 3-2 in which the failure occurred.

When the outgoing line of the communication line 3-2 is reserved, it denotes that the communication line 3-2 is in the direction of the destination user terminal. Consequently, the failure notice message 53 is sent in the direction of the transmission user terminal, that is, to the switching node (the switching node 2-2 in the example) connected via the communication line (the communication line 3-1 in the example) whose incoming line is reserved.

The switching node 2-1 refers to the entry in the reserved resources management table 214 with respect to the flow using the resource of the communication line 3-2 in which the failure occurred. When the incoming line of the communication line 3-2 is reserved, it denotes that the communication line 3-2 is in the direction of the transmission user terminal. Consequently, the failure notice message 53 is sent in the direction of the destination user terminal, that is, to the switching node (the switching node 2-2 in the example) connected via the communication line (the communication line 3-1 in the example) whose outgoing line is reserved.

As mentioned above, if the occurrence position of the detected failure is in the direction of the destination user terminal when it is seen from the self switching node, each of the switching nodes 2-1 to 2-4 sends the failure notice message 53 in the direction to the transmission user terminal. If the occurrence position of the detected failure is in the direction of the transmission user terminal when it is seen from the self switching node, each of the switching nodes 2-1 to 2-4 sends the failure notice message 53 in the direction to the destination user terminal.

Figure 16:
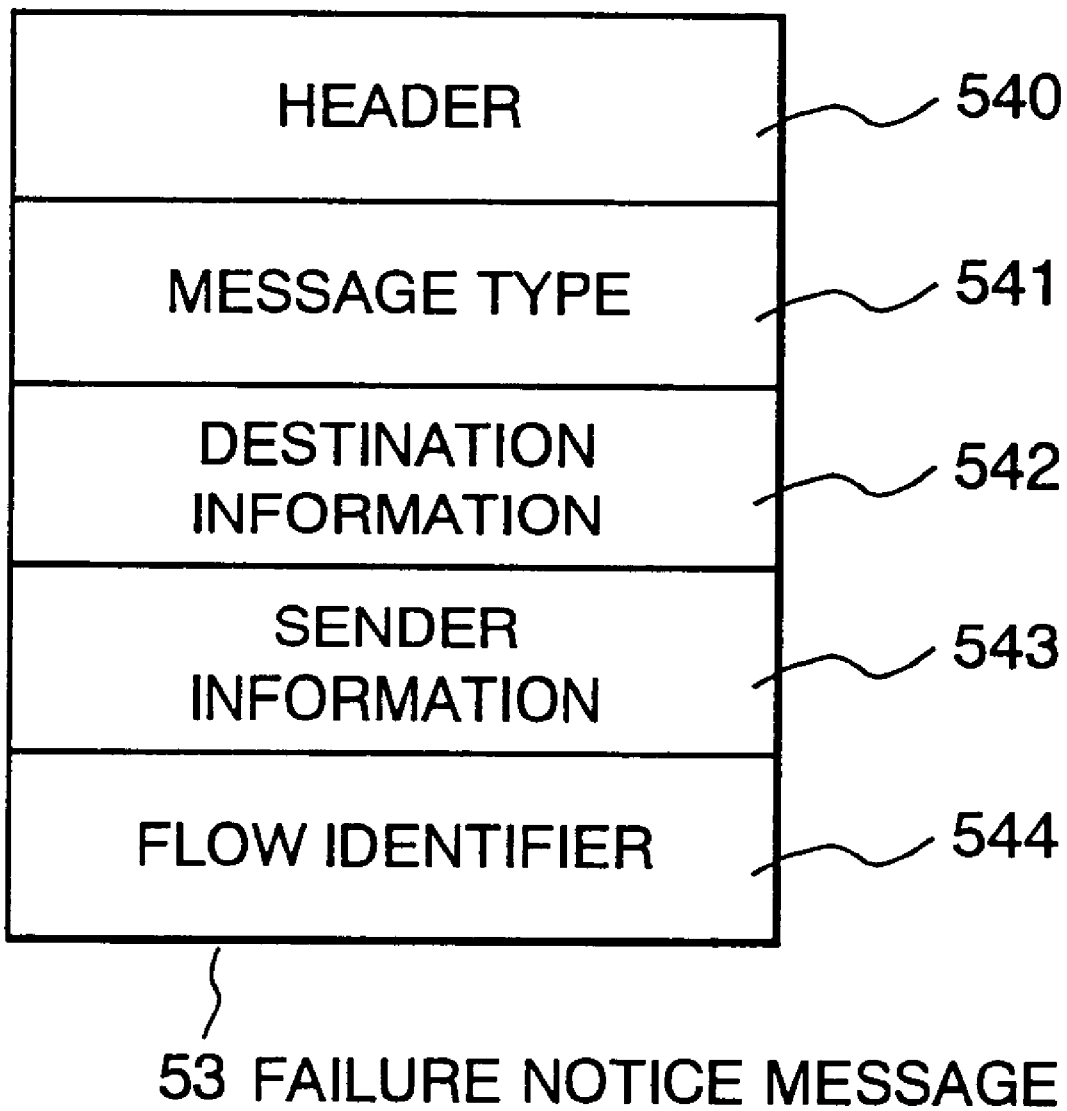
FIG. 16 is a diagram showing the structure of a failure notice message in the first embodiment.

FIG. 16 is a diagram showing the structure of the failure notice message 53. Fields 540 to 544 will be described hereinbelow.

(1) header 540 . . . similar to the header 510 in the resource reservation request message 51.

(2) message type 541 . . . a field in which the identifier of the failure notice message 53 is shown.

(3) destination information 542 . . . similar to the destination information 513 in the resource reservation request message 51.

(4) sender information 543 . . . similar to the sender information 514 in the resource reservation request message 51.

(5) flow identifier 544 . . . similar to the flow identifier 515 in the resource reservation request message 51.

The operation of each of the switching nodes 2-1 to 2-4 received the failure notice message 53 will be described hereinbelow with reference to the flowchart of FIG. 17.

Each of the switching nodes 2-1 to 2-4 which received the failure notice message 53 transfers the failure notice message 53 to the controller 21 via the line interface 22 and the packet switch 20.

Figure 17:
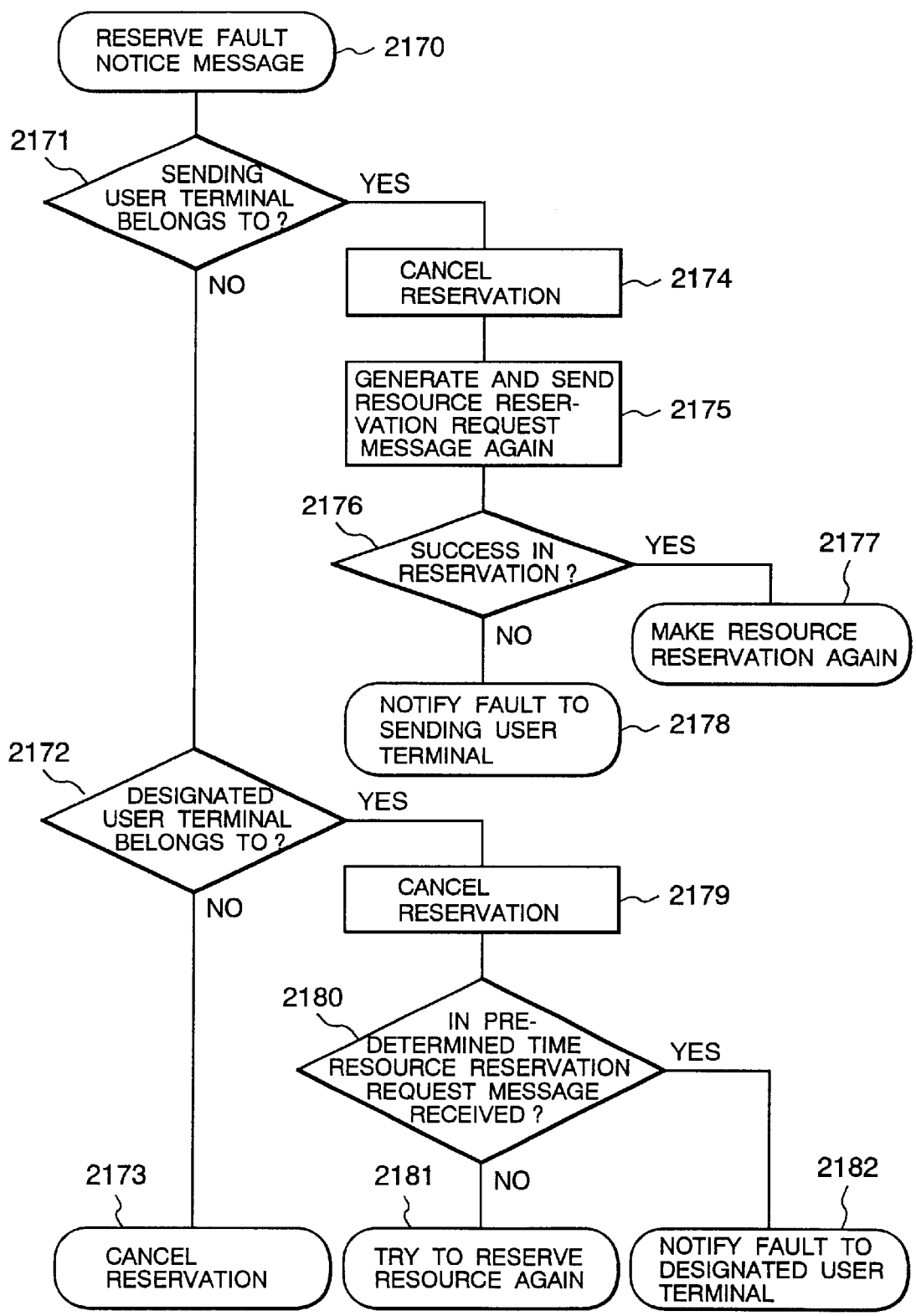
FIG. 17 is a flowchart showing the flow of an operation performed by the switching node when the failure notice message is received in the first embodiment.

When the failure notice message 53 is received, as shown in FIG. 17, first, the controller 21 recognizes that it is the failure notice message 53 on the basis of the message type 541 in the failure notice message 53 (step 2170).

When the transmission user terminal indicated by the sender information 543 in the received failure notice message 53 is not linked to the self switching node (step 2171) and the destination user terminal indicated by the destination information 542 in the failure notice message 53 is not linked to the self switching node (step 2172), the controller 21 eliminates the entry of the flow indicated by the flow identifier 544 in the failure notice message 53 from the reserved resources management table 214, thereby cancelling the reservation in the self switching node (step 2173).

In the case where the transmission and destination user terminals are not linked to the self switching node, the controller 21 transfers the received failure notice message 53 via the communication path of the communication in which the reservation is cancelled.

When the transmission user terminal indicated by the sender information 543 in the received failure notice message 53 is linked to the self switching node (step 2171), by eliminating the entry of the flow indicated by the flow identifier 544 in the failure notice message 53 from the reserved resources management table 214, the controller 21 cancels the reservation in the self switching node (step 2174), generates the resource reservation request message 51 on the basis of the contents stored in the eliminated entry, and resends the generated resource reservation request message 51 to the next switching node of another communication path to the destination user terminal (step 2175).

Figure 18:
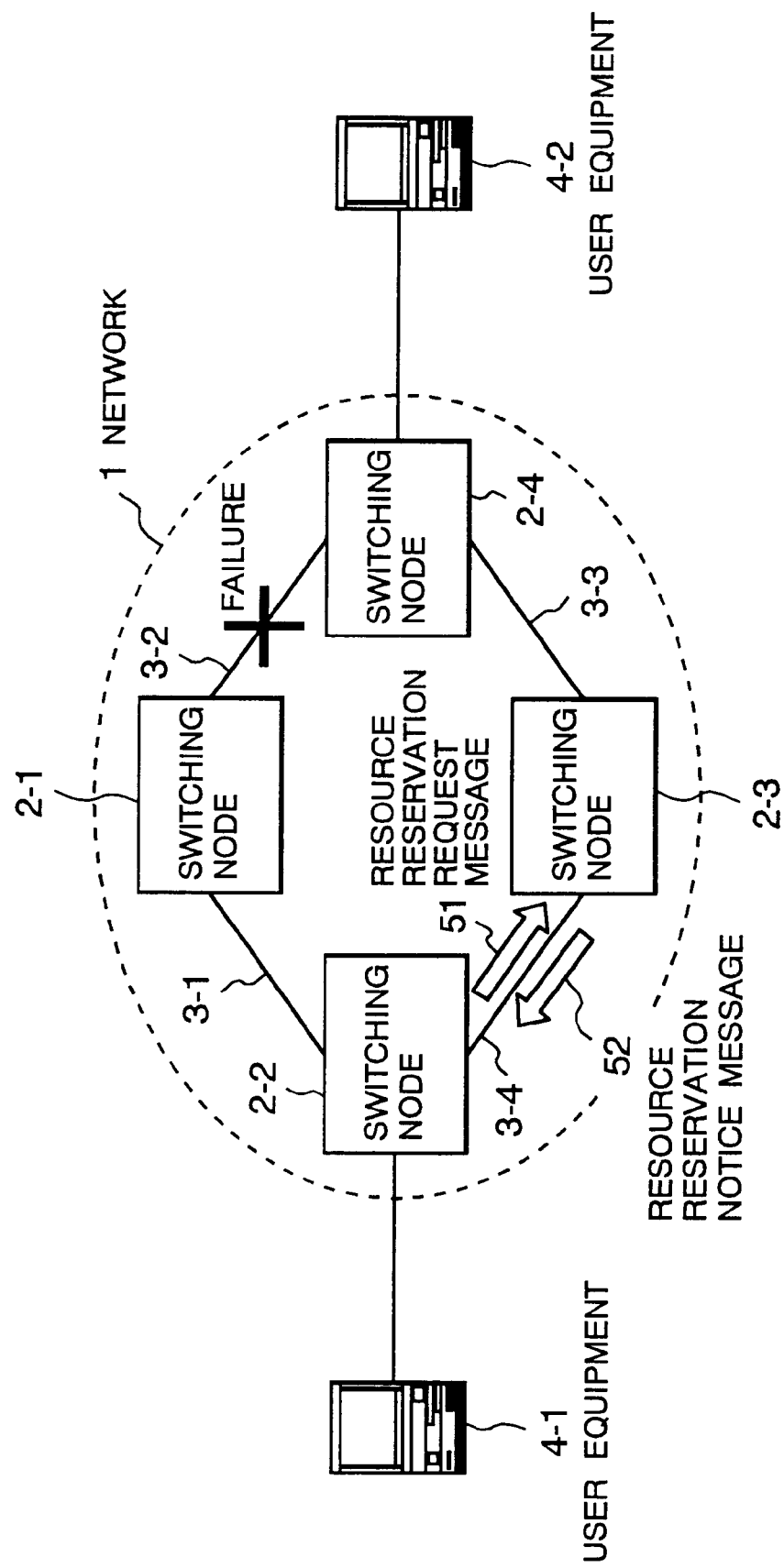
FIG. 18 is a diagram for explaining an example of a failure occurred in the network according to the first embodiment.

For example, as shown in FIG. 18, when the failure notice message 53 is received from the switching node 2-1, the switching node 2-2 to which the user terminal 4-1 as a transmission user terminal is linked resends the resource reservation request message 51 to another switching node (the switching node 2-3 in the example) connected to the self switching node.

Although the example of FIG. 18 shows that another switching node connected to the switching node 2-2 is only the switching node 2-1, when a plurality of other switching nodes are connected, another communication path is reconstructed so as to avoid the failure occurred position by a conventional routing function of the network 1 and appropriate another switching node is selected as a next node.

When the resource reservation result notice message 52 indicative of the success of reservation is received as a response to the resent resource reservation request message 51 (step 2176), the controller 21 reserves the resource again without notifying the transmission user terminal of the failure (step 2177).

When there is no other communication path to the destination user terminal or when the resource reservation result notice message 52 indicative of the failure of reservation is received (step 2176), it denotes that the resource cannot be reserved again. Consequently, the controller 21 transmits the failure notice message 53 to the transmission user terminal (step 2178).

On the other hand, when the destination user terminal indicated by the destination information 542 in the received failure notice message 53 is linked to the switching node (step 2172), by eliminating the entry of the flow indicated by the flow identifier 544 in the failure notice message 53 from the reserved resources management table 214, the controller 21 cancels the reservation in the self switching node (step 2179).

After that, in the case where the controller 21 waits for retransmission of the resource reservation request message 51 of the communication in which the reservation is cancelled from the switching node on the transmission user terminal side for a predetermined waiting time as mentioned above and receives the retransmitted resource reservation request message 51 (step 2180), the resource is reserved again without notifying the destination user terminal of the failure (step 2181).

When the retransmitted resource reservation request message 51 is not received after the predetermined waiting time has elapsed (step 2180), since it denotes that the resource cannot be reserved again, the controller 21 sends the failure notice message 53 to the destination user terminal (step 2182).

It is not always necessary to send the failure notice message 53 to the destination user terminal. However, since the service in the service class "A" or "A–" is adapted to the communication requiring the real-time performance, it can be considered that the user of the destination user terminal knows the contents of the reservation. It is consequently preferable to send the failure notice message 53 also to the destination user terminal when the resource used for the communication in which the service in the service class "A" or "A–" is received cannot be reserved again.

A second embodiment of the invention will be described mainly with respect to points different from the first embodiment.

Figure 19:
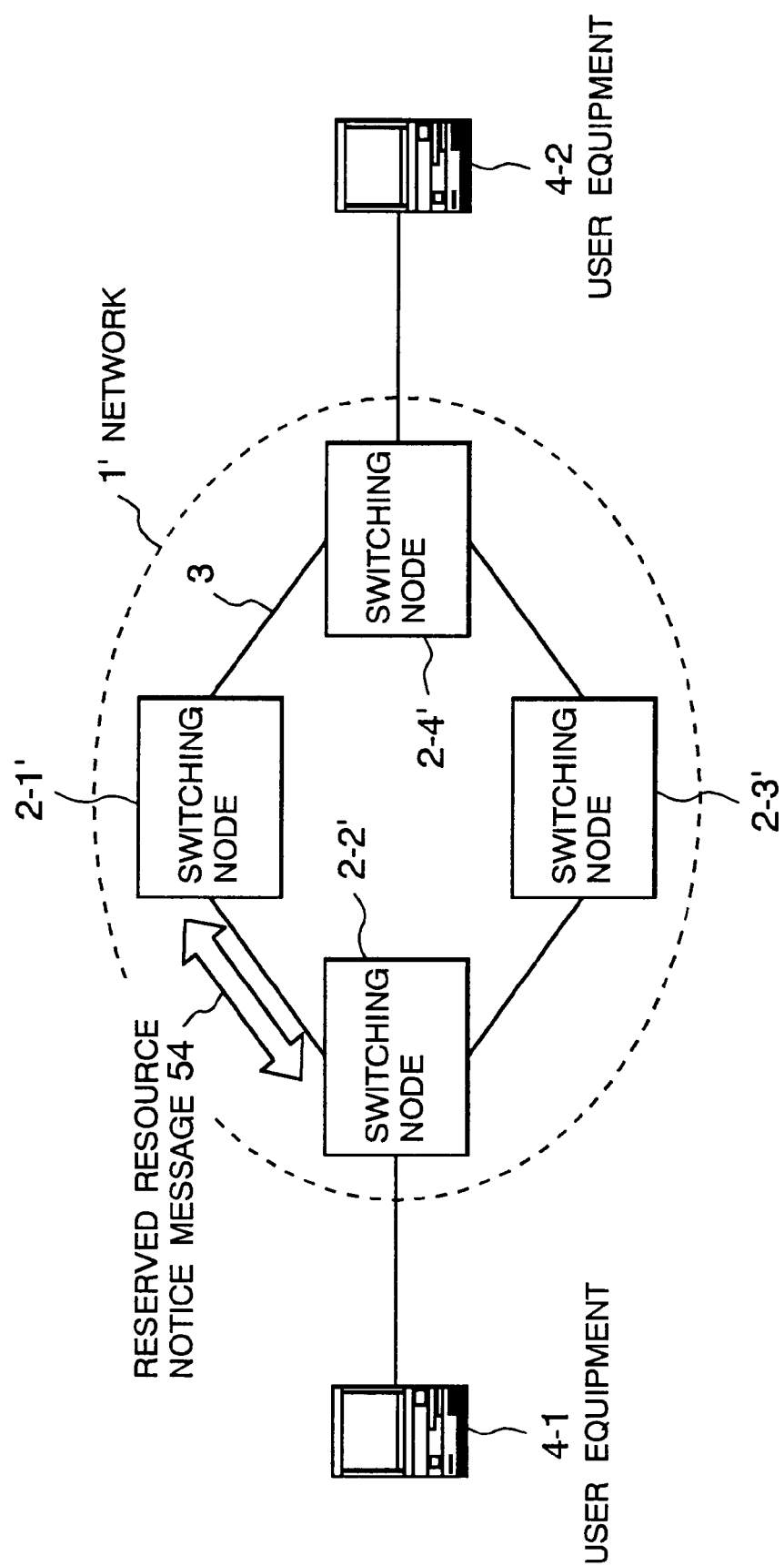
FIG. 19 is a diagram showing the whole construction of a network according to a second embodiment.

FIG. 19 is a diagram showing the whole construction of a network according to the second embodiment.

According to the example of FIG. 19, a network 1' connects four switching nodes 2-1' to 2-4' via the communication line 3. Especially, the switching nodes 2-1' to 2-4' are network devices such as routers or ATM switching devices.

In the example of FIG. 19, two user terminals 4-1 and 4-2 are linked to the switching nodes 2-2' and 2-4', respectively. The user terminals 4-1 and 4-2 are network devices of the user connected to the network 1'. Although the user terminals 4-1 and 4-2 are shown as PCs in FIG. 19, they can be network devices such as routers or ATM switching devices.

In the first embodiment, each of the switching nodes 2-1 to 2-4 manages only the reservation state of the resource which can be used by the self switching node and the next switching node of the communication path to the destination user terminal is selected by the conventional routing function of the network 1 when the resource reservation request message 51 is transferred. In the second embodiment, by exchanging the contents of the management of the self switching node among the switching nodes 2-1' to 2-4', the next switching node of the communication path to the destination user terminal can be selected on the basis of the management contents of other switching nodes, that is, a reservation state of the resources of the whole network 1' when the resource reservation request message 51 is transferred.

For example, as shown in FIG. 19, by exchanging a reserved resource notice message 54 among the switching nodes, each of the switching nodes 2-1' to 2-4' notifies the other switching nodes of the management contents of the self switching node.

Figure 20:
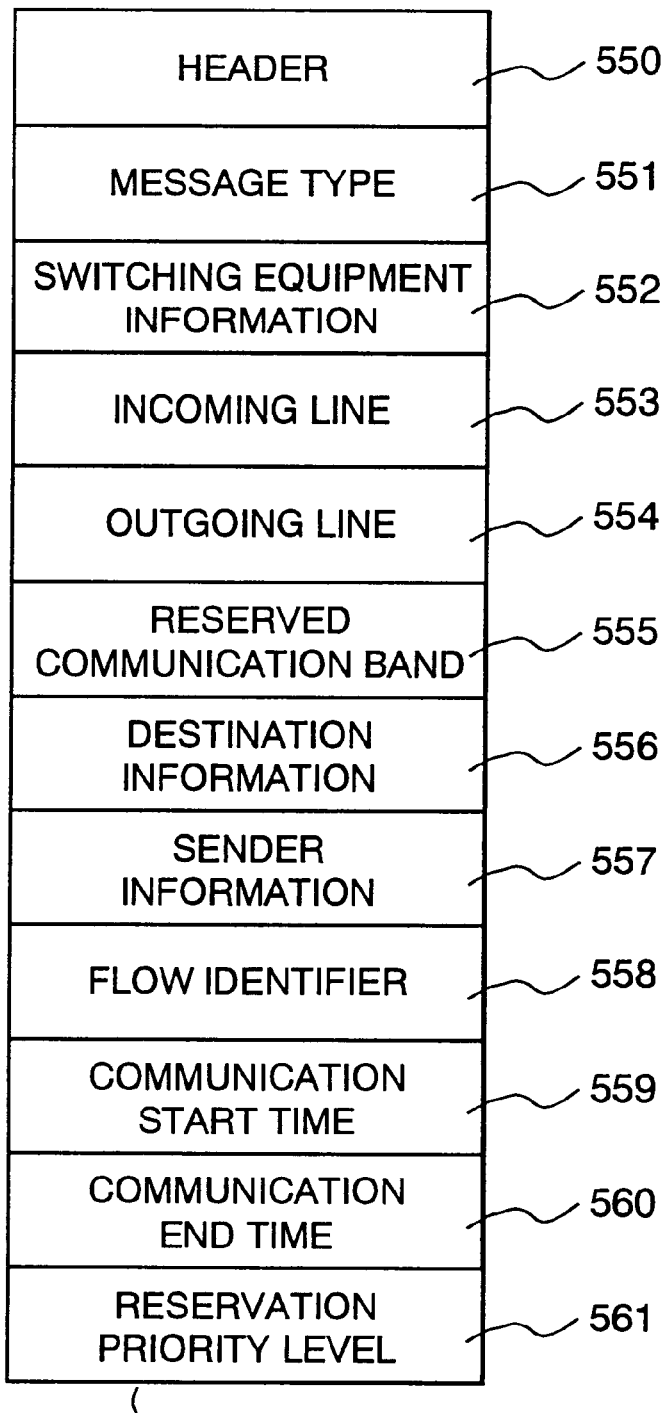
FIG. 20 is a diagram showing the structure of a reservation resource notice message in the second embodiment.

FIG. 20 is a diagram showing the structure of the reserved resource notice message 54. Fields 550 to 561 will be described hereinbelow.

(1) header 550 . . . similar to the header 510 in the resource reservation request message 51.

(2) message type 551 . . . a field in which the identifier of the reserved resource notice message 54 is shown.

(3) switching node information 552 . . . a field in a which the identifier of a switching node for notifying the reserved resource is shown.

(4) incoming line 553 . . . a field showing an incoming line interface number of the flow in which the resource is reserved.

(5) outgoing line 554 . . . a field showing an outgoing line interface number in which the resource is reserved.

(6) reserved band 555 . . . a field in which a reserved communication rate (bits/sec or the like) is shown.

(7) destination information 556 . . . similar to the destination information 513 in the resource reservation request message 51.

(8) sender information 557 . . . similar to the sender information 514 in the resource reservation request message 51.

(9) flow identifier 558 . . . similar to the flow identifier 515 in the resource reservation request message 51.

(10) communication start time 559 . . . a field in which guarantee start date and time when the network 1' starts to guarantee the communication at the communication rate shown by the reservation band 555 is shown.

(11) communication start time 560 . . . a field in which guarantee end date and time when the network 1' finishes guaranteeing the communication at the communication rate shown by the reserved band 555 is shown.

(12) reservation priority 561 . . . similar to the reservation priority 518 in the resource reservation request message 51.

Each time a resource is reserved by the self switching node, each of the switching nodes 2-11 to 24' notifies the contents of the reservation to all of the other switching nodes by the reserved resource notice message 54.

As shown in FIG. 21, the switching nodes 2-1' to 2-4' store and hold resource management tables 210-1 to 210-4 for managing resources which can be used by all of the other switching nodes in the network 1' in addition to the resources which can be used by the self switching node. The contents of the resource management tables 210-1 to 210-4 are preset by the net manager or the like.

Figure 22:
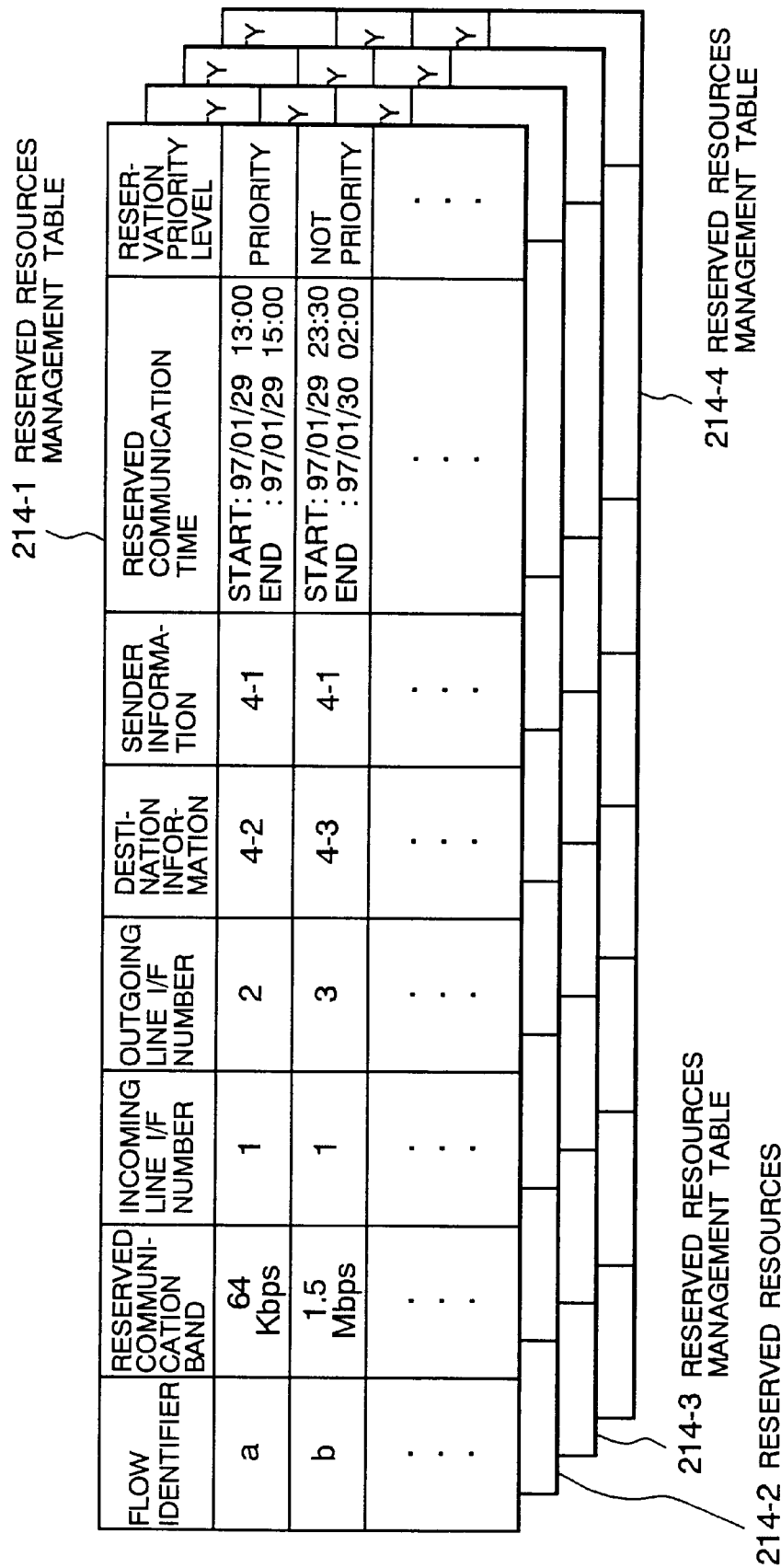
FIG. 22 is a diagram for explaining the contents of a reservation resource management table in the second embodiment.

As shown in FIG. 22, the switching nodes 2-1' to 2-4' store and hold reserved resources management tables 214-1 to 214-4 for managing the resources reserved by all of the other switching nodes in the network 1' in addition to the resources reserved by the self switching node.

Since each of the switching nodes 2-1' to 2-4' received the reservation resource notice message 54 from the other switching nodes changes the contents of the reservation resource management table corresponding to the switching node shown by the switching node information 552 in the reservation resource notice message 54 in accordance with the reservation resource notice message 54, the contents of the reserved resources management tables 214-1 to 214-4 stored and held by the switching nodes 2-1' to 2-4' are always the same.

When the resource reservation request message 51 is transferred, each of the switching nodes 2-1' to 2-4' can select the next switching node in the communication path to the destination user terminal so that the communication path having many empty resources is constructed on the basis of the contents of the reservation resource management table corresponding to the other switching nodes, that is, the resource reservation state of the whole network 1'. Thus, according to the second embodiment, the use efficiency of the resource can be improved.

Since the switching nodes 2-1' to 2-4' manage the resource reservation state of the whole network 1' in the second embodiment, a load on each of the switching nodes 2-1' to 2-4' is increased. In order to reduce the load on each of the switching nodes 2-1' to 2-4', a resource management server as a dedicated server for managing the resource reservation state of the whole network 1' can be also provided.

An embodiment using the resource management server will be described hereinbelow as a third embodiment and points different from the first embodiment will be mainly described.

Figure 23:
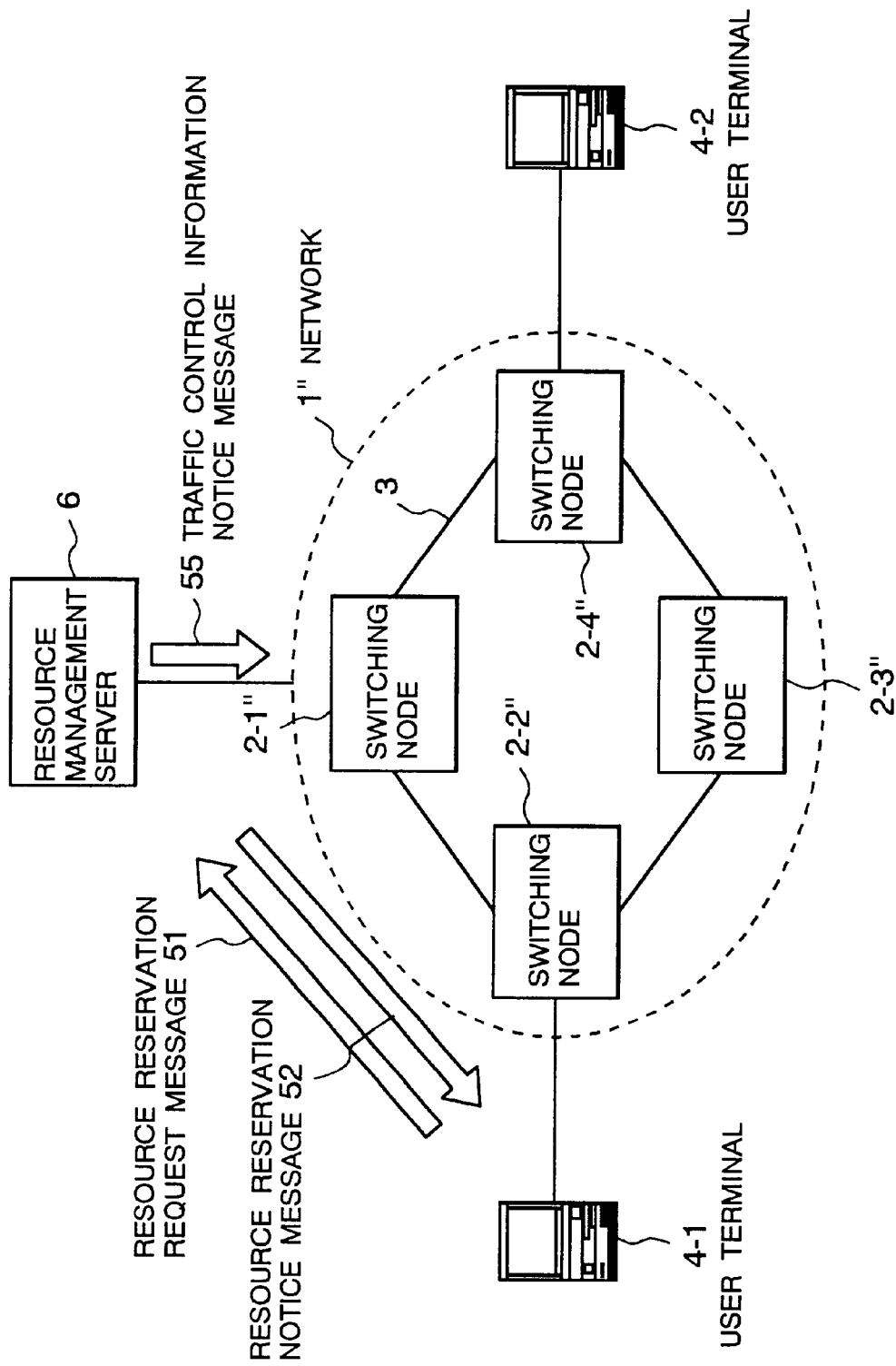
FIG. 23 is a diagram showing the whole construction of a network according to a third embodiment.

FIG. 23 is a diagram showing the whole construction of a network according to the third embodiment.

In the example of FIG. 23, a network 1" connects four switching nodes 2-1" to 2-4" via a communication line 3. Specifically, the switching nodes 2-1" to 2-4" are network devices such as routers or ATM switching devices.

In the example of FIG. 23, two user terminals 4-1 and 4-2 are linked to the switching nodes 2-2" and 2-4", respectively. The user terminals 4-1 and 4-2 are network devices of the user, which are connected to the network 1". Although the user terminals 4-1 and 4-2 are shown as PCs in FIG. 23, they can be network devices such as routers or ATM switching devices.

According to the example of FIG. 23, a resource management server 6 for managing the resource reservation state of the whole network 1" is connected to the network 1".

The resource management server 6 stores and holds the resource management tables 210-1 to 210-4 shown in FIG. 21 and the reserved resources management tables 214-1 to 214-4 shown in FIG. 22.

For example, when the user terminal 4-1 requests the resource reservation to the network 1", as shown in FIG. 23, the user terminal 4-1 sends the resource reservation request message 51 to the resource management server 6, thereby requesting the network 1" to reserve the resource. The resource management server 6 sends the resource reservation result notice message 52 to the user terminal 4-1, thereby notifying the user terminal 4-1 of the reservation result.

The resource management server 6 executes processes similar to the resource reserving processes described in the first embodiment in a lump in the self resource management server 6. The resource management server 6 can, therefore, construct the communication path having many empty resources on the basis of the resource reservation state of the whole network 1".

The traffic control information 220 necessary for realizing the traffic control described in the first embodiment is supplied from the resource management server 6 to the switching nodes 2-1", to 2-41, by the traffic control information notice message 55 as shown in FIG. 23.

Figure 24:
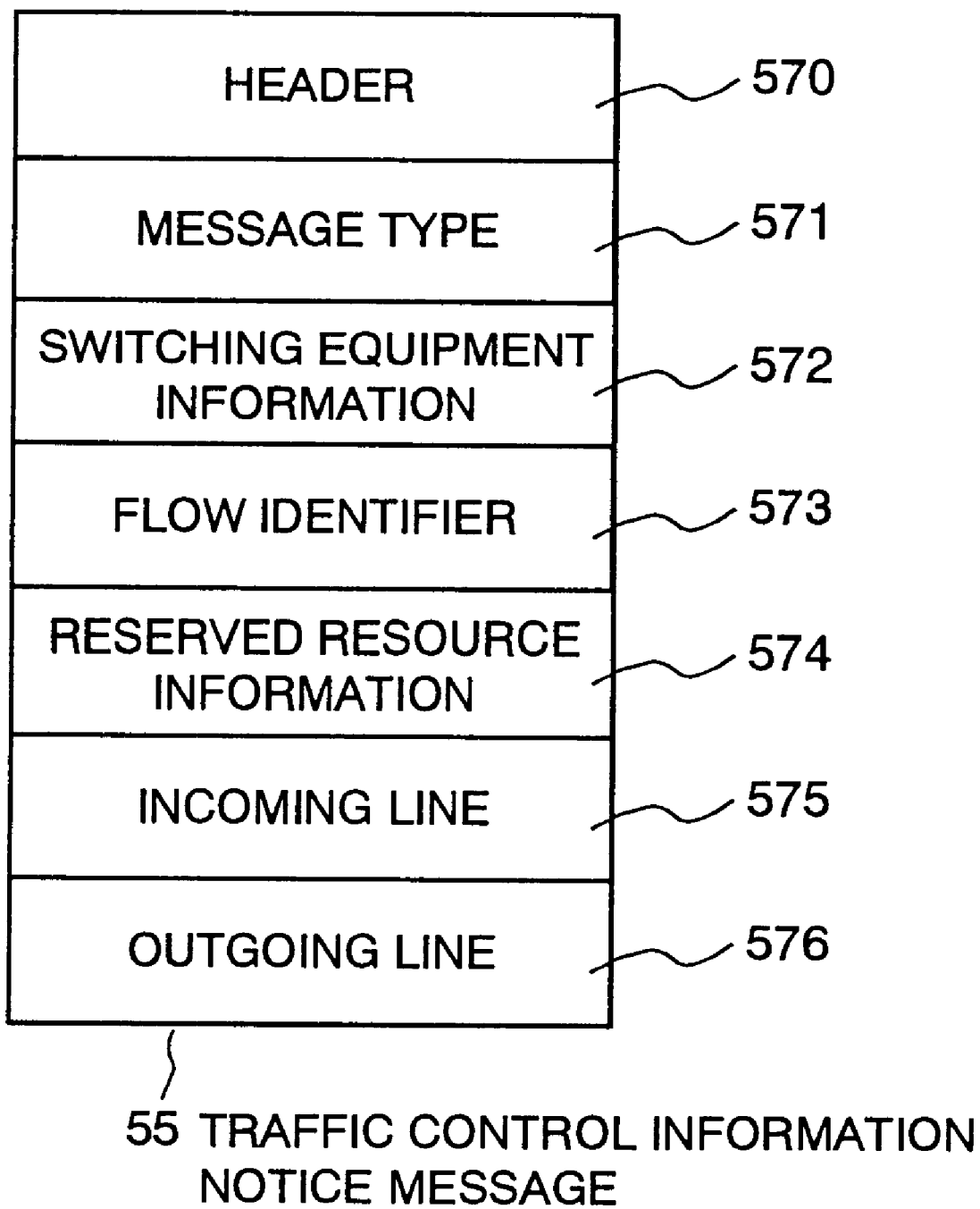
FIG. 24 is a diagram showing the structure of a traffic control information notice message in the third embodiment.

FIG. 24 is a diagram showing the structure of the traffic control information notice message 55. Fields 570 to 576 will be described hereinbelow.

(1) header 570 . . . similar to the head 510 in the resource reservation request message 51.

(2) message type 571 . . . a field in which the identifier of the traffic control information notice message 55 is shown.

(3) switching node information 572 . . . a field in which the identifier of the switching node for notifying the traffic control information 220 is shown.

(4) flow identifier 573 . . . similar to the flow identifier 515 in the resource reservation request message 51.

(5) reservation resource information 574 . . . a field in which the reserved resource is shown.

(6) incoming line 575 . . . a field showing an incoming line interface number of the flow in which the traffic control is performed.

(7) outgoing line 576 . . . a field showing an outgoing line interface number of the flow in which the traffic control is performed.

According to the third embodiment, since the resource management server 6 can construct the communication path having many empty resources on the basis of the resource reservation state of the whole network 1", the use efficiency of the resources can be improved in a manner similar to the second embodiment.

According to the third embodiment, since the resource management server 6 concentratedly manages the resource reservation state, loads on the switching nodes 2-1" to 2-4", can be reduced.

As mentioned above, according to the invention, a resource which will be used in a future communication can be preliminarily reserved.

By giving priorities to the reservations, the reservation with respect to an important communication can be preferentially performed.

With respect to the communication which does not require a real-time performance, the network allocates proper communication time. Consequently, the resource can be effectively used and low-cost service can be provided to the user.

An embodiment of the invention regarding the construction of the user equipment, display on a picture plane, and the operation will be described hereinbelow with reference to the drawings.

Figure 25:
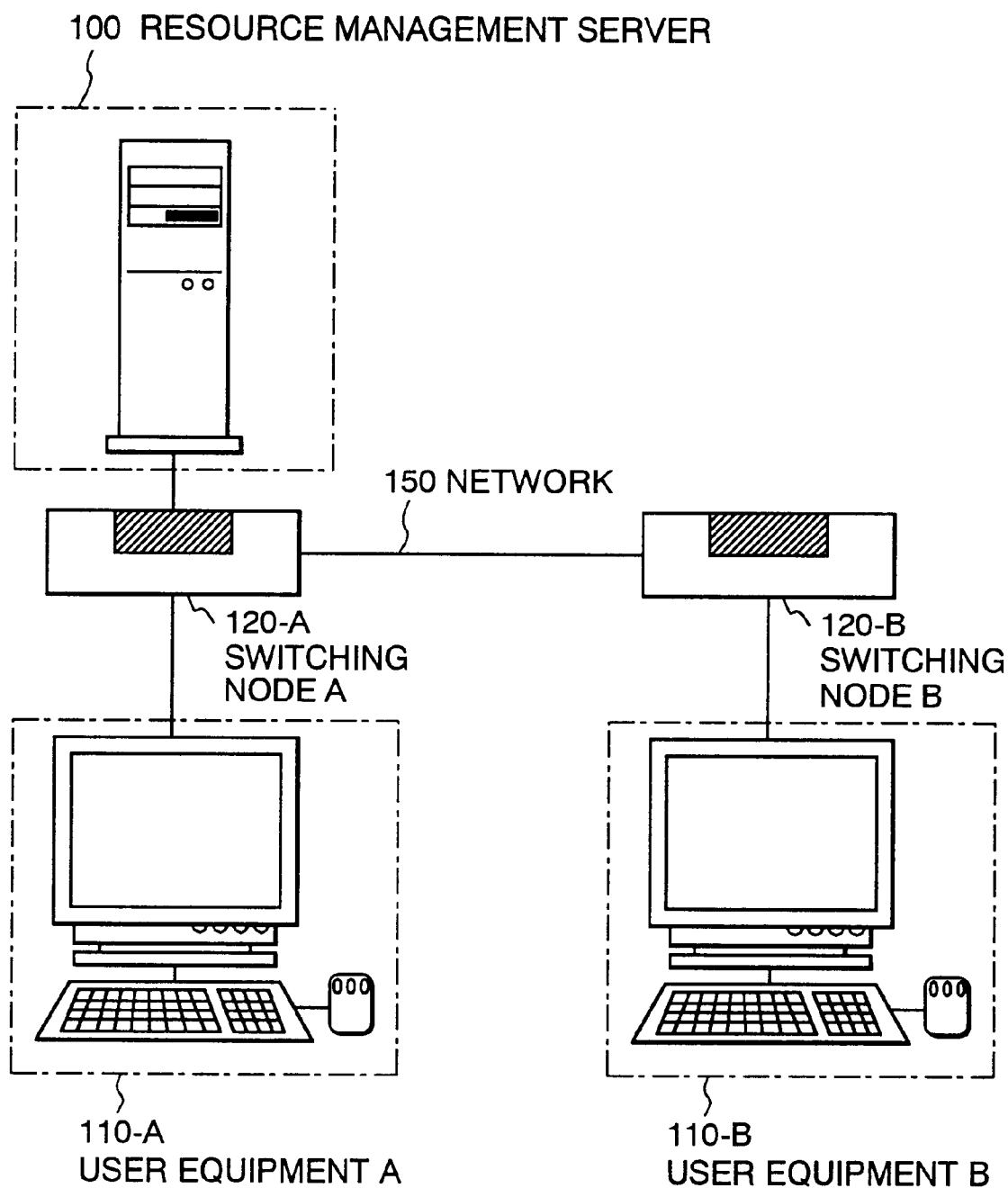
FIG. 25 is a system construction diagram of an embodiment of the invention.

FIG. 25 shows the whole construction of a network system as an embodiment of the invention.

User equipment is connected to either one of switching nodes via a network. In the example of the diagram, user equipment A is connected to a switching node A and user equipment B is connected to a switching node B.

The switching node is connected to another switching node via the network. In the example, the switching node A and the switching node B are connected via the network.

A resource management server is connected to one of the switching nodes in the network. Although only one resource management server is installed to the whole network in the embodiment, a plurality of resource management servers can be also provided to improve reliability.

For simplicity, the case of using two switching nodes, two user equipments, and one resource management server is shown. It is obviously understood that functions similar to those of the embodiment can be realized also in a case of a larger-scale network construction including a number of switching nodes, user equipments, and resource management servers.

Although a case in which the resource management server is realized as an independent device is described in the embodiment, the function itself of the resource management server can be also built in another device. For example, the function of the resource management server can be built in one of the switching nodes of the embodiment.

Figure 26:
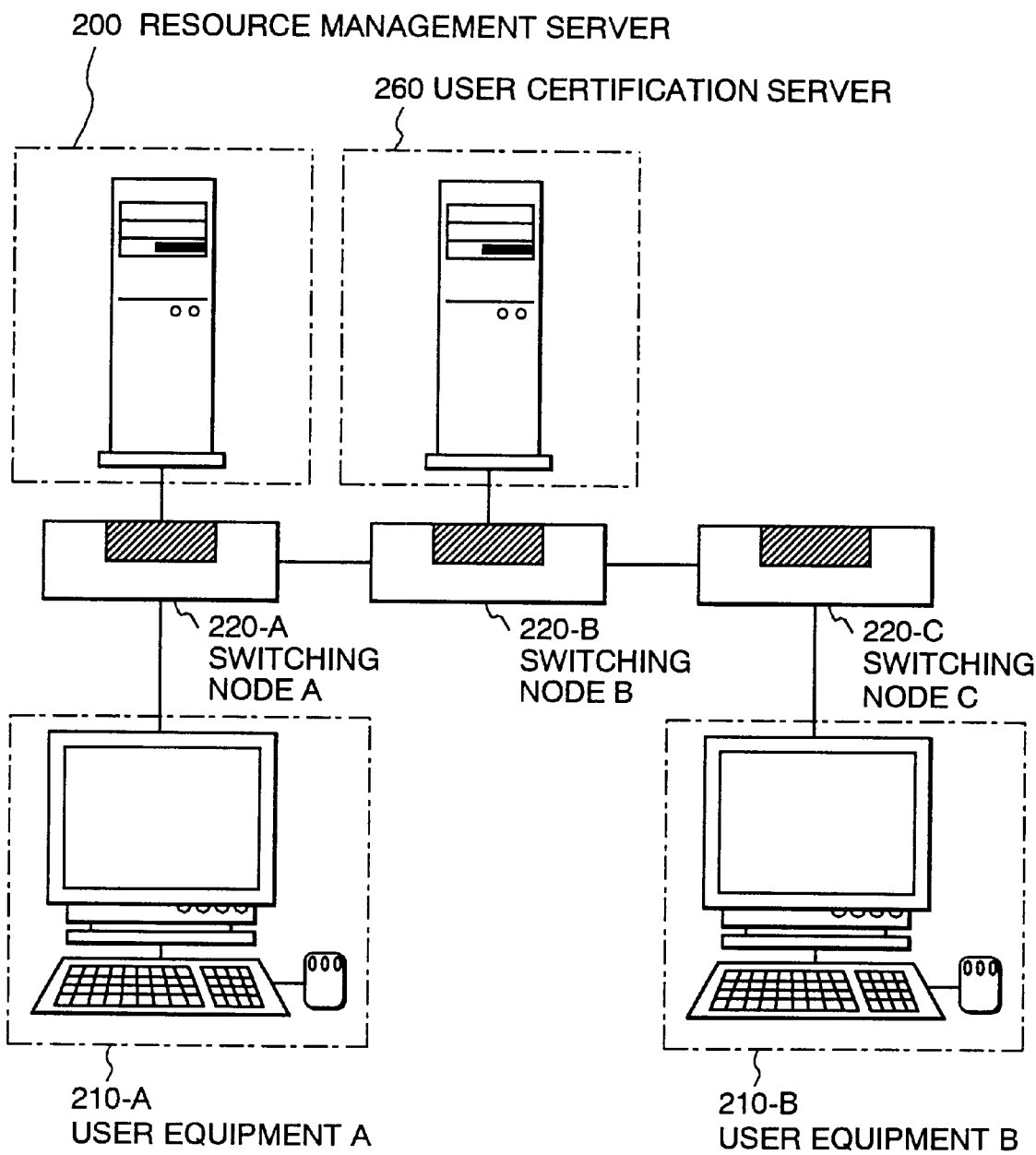
FIG. 26 is a system construction diagram of another embodiment of the invention.

FIG. 26 shows another embodiment in which three switching nodes are connected and a user certification server is installed.

In the case where the user certification server is installed, a user certification function can be added to the resource managing function realized in the embodiment. The resource managing method of the invention can be also applied to a case where the user equipments are connected via three or more switching nodes.

Although a case in which the resource management server and the user certification server are realized as independent devices is described in the embodiment, the functions of the resource management server and the user certification server can be also included in other devices. For example, one of the switching nodes of the embodiment can have therein the function of the resource management server and another switching node can include the function of the user certification server.

A case in which two user equipments are connected and a communication between two points is performed is shown in the embodiment. The resource reservation function using the resource management server can be also applied to so-called a multicast communication for performing a communication from one user equipment to two or more user equipments.

Figure 27:
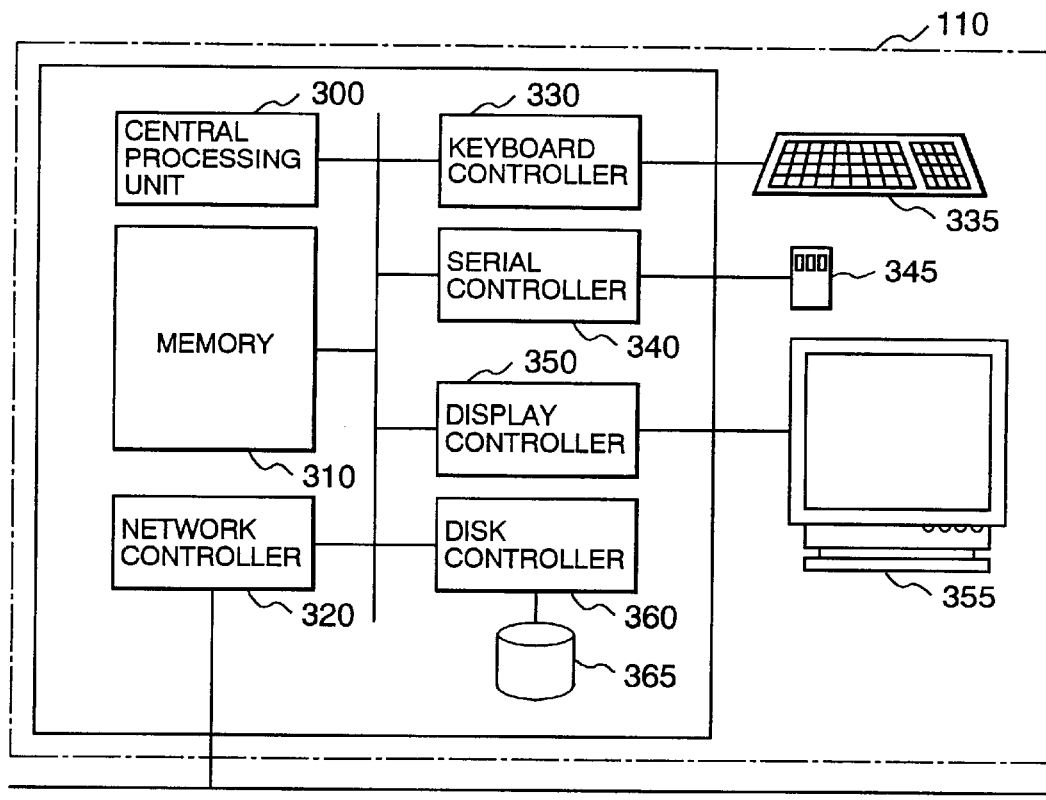
FIG. 27 is a system construction diagram of user equipment.

FIG. 27 shows the system configuration of the user equipment.

A CPU (Central Processing Unit) 300 reads out and executes a program stored in a main memory. Various software for controlling the user equipment has been stored in the main memory 310. The user equipment is connected to the network via a network controller 320. An input from a keyboard 335 is sent to a keyboard controller 330 and is processed. An input from a mouse 345 is sent to a serial controller 346 and is processed. Display on a display 355 is controlled by a display controller 350. A disk device 365 built in the user equipment is controlled by a disk controller 360.

Figure 28:
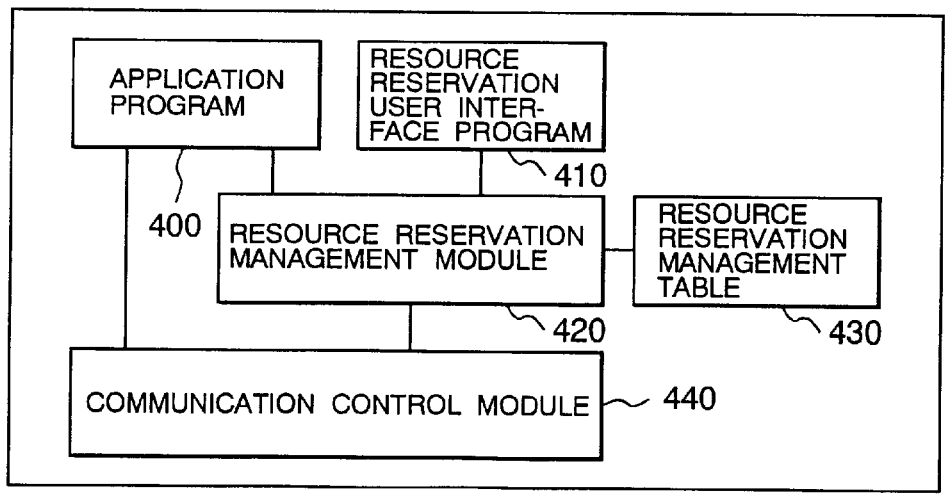
FIG. 28 is a diagram showing the structure of software of the user equipment.

FIG. 28 shows the software structure of the user equipment.

A communication control module 440 controls data transmission to the network and data receipt from the network. An application program 400 can execute a process peculiar to the application program while transmitting and receiving data by using the communication control module. A resource reservation user interface (UI) program 410 controls the user interface regarding the resource reserving process. A resource reservation management module 420 manages the contents of a resource management table 430 by the operation of the user, in response to a request from the resource management server, or the like.

FIG. 29 shows a resource reservation request window.

When the user of the user equipment reserves a resource, the user inputs desired reservation data on the resource reservation request window. The inputted data is sent to the resource management server and is approved or refused by the determination of the resource management server.

On the resource reservation request window 500, fields to input the name 510 of a resource management server which receives the resource reservation request, communication destination information 520 desired to be reserved, communication quality 530 desired to be reserved, and date and time 560 of desired to be reserved are displayed. By depressing a communication destination definition button 540 or a communication quality definition button 550, the communication destination and the communication quality which are frequently used can be defined as a reservation template or referred to.

When the user depresses an OK button 590, the inputted reservation data is sent to the resource management server. When the user depresses a cancellation button 595, the reservation request is not sent. When the communication destination or the communication quality are designated, a reservation template is used. In the example of the drawing, a reservation template "sales department's video server" is used for the communication destination and a reservation template "real-time video/audio (1.5 Mbps)" is used for the communication quality. When the reservation template is selected, since the communication band 570, the communication volume 580, and the like are automatically set, the user does not have to have a high degree of technical knowledge such as the method of designation of a necessary resource. Consequently, the end user can easily reserve a necessary communication resource.

The reservation template can be formed by the network manager and can be originally defined by the user who understands the technical details.

FIG. 30 shows a communication destination template window.

By designating the name 610 of a template, the name 620 of a communication destination host, and a communication destination port number 630, a new template can be defined. When another template which has been already defined is selected by the name 610 of the template, the contents of the setting can be changed.

Figures 31, 32:
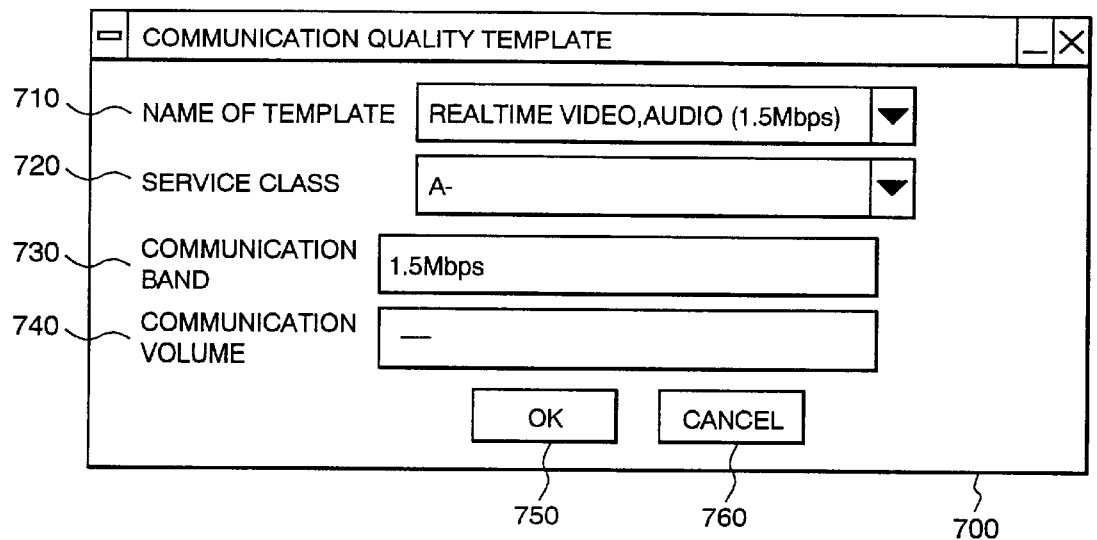
FIG. 31 shows a communication quality template window.
FIG. 32 shows a list of service classes which can be used.

FIG. 31 shows a communication quality template window.

By designating the name 710 of a template, the name 720 of a communication destination host, and a communication destination port number 730, a new template can be defined. When another template which has been already defined is selected by the name 710 of the template, the contents of the setting can be changed.

FIG. 32 shows an example of service classes which can be designated.

In the embodiment, five service classes shown in FIG. 8 are defined.

Service class A is the service class in which the communication time and the communication band can be designated and a reservation can be preferentially accepted over a regular reservation.

Service class A–is the service class in which the communication time and the communication band can be designated and a reservation can be accepted with a regular priority.

It is presumed that the service class A or A–is designated in a case such as a video conference in which a communication is desired to be performed by using a specific communication band at a specific time.

Service class B is the service class in which the communication time and communication quantity can be designated and a reservation can be accepted preferentially over a regular reservation.

Service class B– is the service class in which the communication time and the communication quantity can be designated and a reservation is accepted with a regular priority.

It is presumed that the service class B or B–is designated in a case such as a file transfer in which a certain quantity of data is desired to be sent until a specific time.

Service class C is the service class in which a reservation can be accepted with a regular priority without especially designating the communication time and the like.

It is presumed that the service class C is designated at the time of a general data communication what is called "best effort".

Among the five service classes, the class A is the most expensive (cost 5), the class A–is the next most expensive, and the class C is the cheapest (cost 1) in such an order. The user can perform the communication by selecting a proper service class according to the purpose of the communication and the permissible range of the costs.

Further, it will be obviously understood that, in addition to the above service classes, new service classes according to the purpose of the application, the kinds of network resources to be reserved, the method of setting the priority, and the like can be defined.

Figure 33:
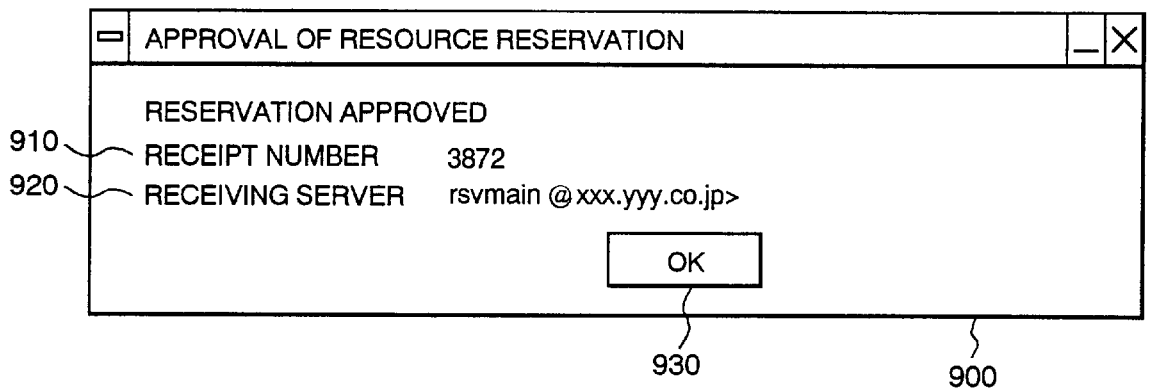
FIG. 33 shows a resource reservation approval notice window.

FIG. 33 shows a resource reservation approval notice window.

The resource management server determines whether the reservation is approved or not on the basis of the contents of the resource reservation request sent from the user equipment. When the reservation request is approved, approval of the reservation is notified to the user equipment. When the reservation is approved, the user equipment displays a resource reservation approval notice window 900, thereby notifying the user of the approval of the reservation request.

On the resource reservation approval notice window 900, a reservation receipt number 910 issued when the resource management server accepts the reservation and the name 920 of the resource management server which accepted the reservation request. When the user depresses an OK button 930, the resource reservation approval notice window 900 is erased.

Figure 34:
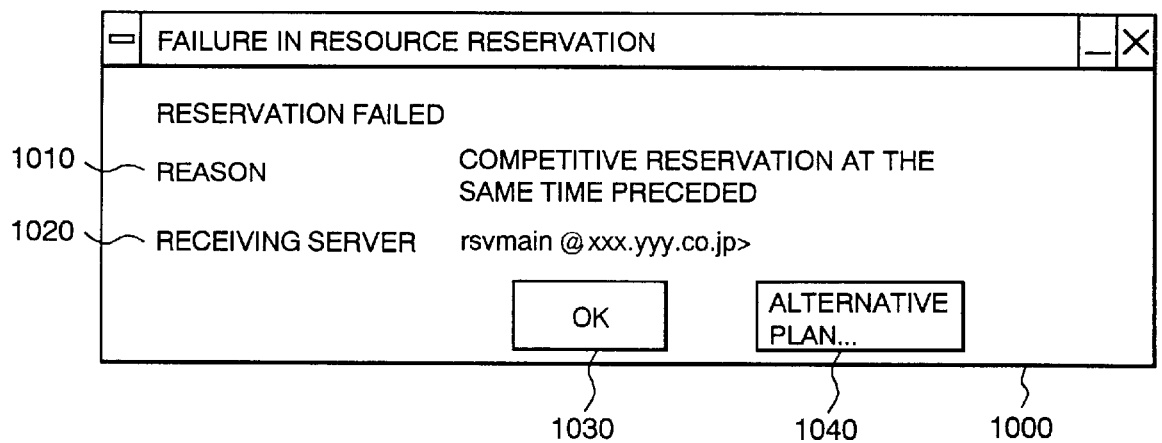
FIG. 34 shows a resource reservation failure notice window.

FIG. 34 shows a resource reservation failure notice window.

When the resource reservation request sent from the user equipment is not approved, the resource management server notifies the user equipment of refusal of the reservation. By displaying the resource reservation failure notice window, the user equipment notifies the user of the failure of the reservation request.

On the resource reservation failure notice window 1000, reason 1010 of the reservation refusal and the name 1020 of the resource management server which received the reservation request are displayed. When the user depresses an OK button 1030, the resource reservation failure notice window 1000 is erased.

According to the example, the reason of the failure in reservation that there is a competitive reservation at the same time is shown. Consequently, the user can know the reason why the reservation has failed by the notice from the resource management server.

In the resource managing method of the invention, since the resource management server manages all of the resource reservations, whether a reservation can be performed or not can be easily determined.

Further, whether a reservation can be performed or not can be determined on the basis of information such as the right of the user who sent the resource reservation request and the priority of communication in which reservation is intended to be done.

In the embodiment, if the user depresses an alternative plan button 1040, an alternative plan which can be reserved under conditions similar to those of the failed reservation is proposed.

Figure 35:
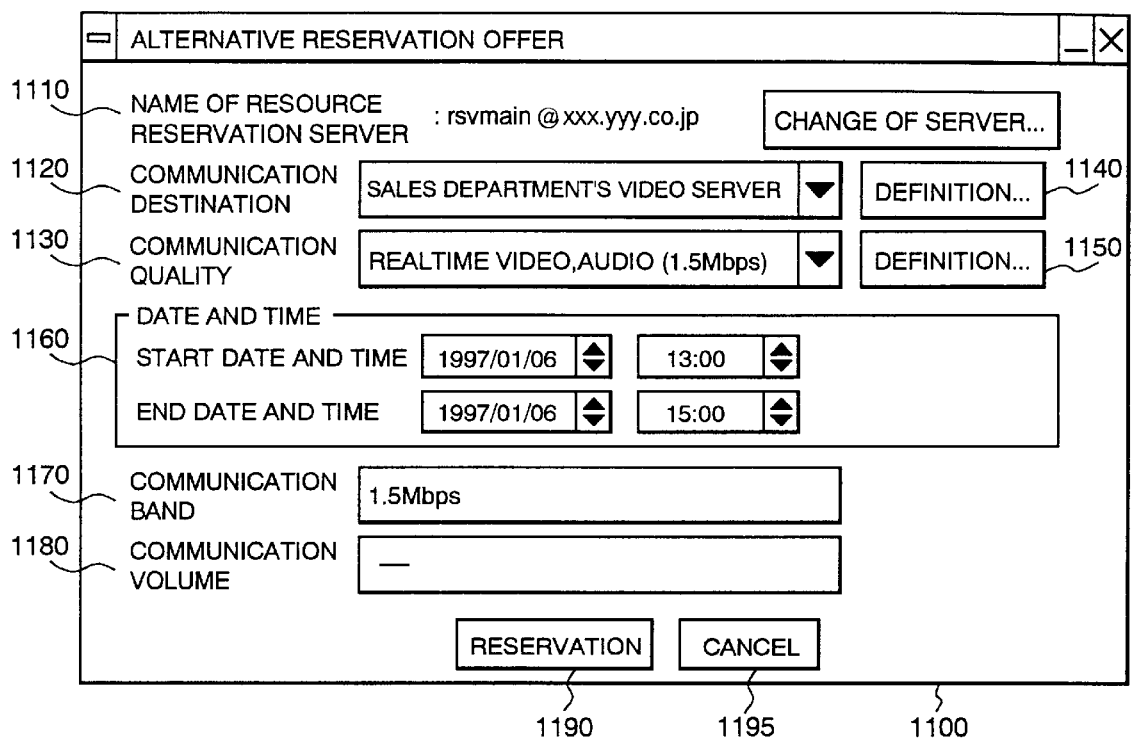
FIG. 35 shows an alternative reservation offer window.

FIG. 35 shows an alternative reservation offer window 1100.

When the resource reservation request is refused, a resource management module in the user equipment refers to a reason code of the refusal of the resource reservation request, inquires of the resource management server the reservation state and offers a proper alternative reservation plan.

On the alternative reservation offer window 1100, the name 1110 of the resource reservation server, communication destination 1120, a communication destination definition button 1140, communication quality 1130, a communication quality definition button 1150, communication time 1160, a communication band 1170, a communication volume 1180, and the like which are chosen by the resource management module are shown. When a reservation button 1190 is depressed, the reservation request of the proposed contents is issued. When a cancellation button 1195 is depressed, the reservation request is not issued.

Since the alternative reservation offer is automatically calculated and displayed as mentioned above, even if a reservation is failed, the user can promptly try another reservation. Since the information regarding the present reservation state is considered in the alternative offer, a reservation request according to the offer is almost certainly approved. Consequently, the user does not have to issue vain reservation requests many times.

Figure 36:
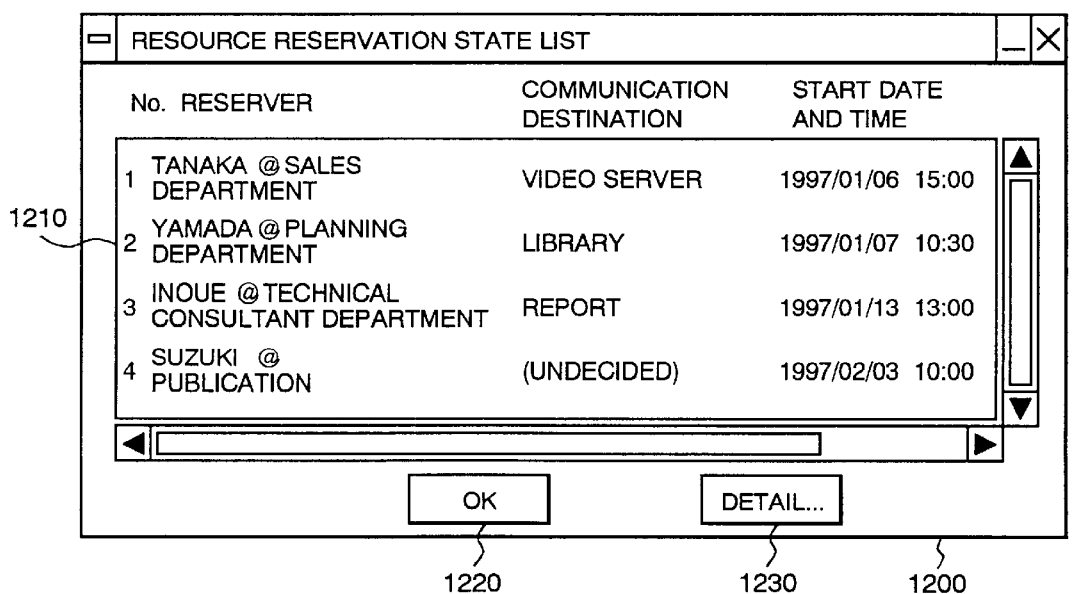
FIG. 36 shows a resource reservation list window.

FIG. 36 shows a resource reservation list window.

The user of the user equipment can always confirm the present resource reservation state in accordance with necessity.

On the resource reservation list window 1200, a reservation information list 1210 including a reserver, a communication destination, communication start date and time, communication end date and time, communication quality, and the like is displayed. When the user depresses an OK button 1220, the resource reservation list window 1200 is erased.

When the user depresses a detail button 1230, detailed information regarding a reservation item selected in the reservation information list at that time is displayed on the resource reservation detail window. Since the user can always confirm the resource reservation state as mentioned above, the reservation request can be issued in consideration of the use state of the network.

FIG. 37 shows a resource reservation detail window.

When an item in the reservation list displayed on the resource reservation list window is selected and the detail button is depressed, the resource reservation detail window is displayed. On the resource reservation detail window 1300, the name 1310 of the user who reserved, communication destination information 1320 of the reservation, communication quality information 1330 of the reservation, communication start time 1340 of the reservation, communication end time 1350 of the reservation, reservation receipt number 1360 of the reservation, and the name 1360 of a resource management server which received the reservation are displayed. When a close button 1380 is depressed, the resource reservation detail window is closed. When a reservation change button 1385 is depressed, a window on which the reservation is changed is displayed. When a reservation cancellation button 1390 is depressed, the reservation is cancelled.

FIG. 38 shows a data format of a resource reservation request message.

The resource reservation request message 1400 consists of header information 1410, a code 1420 indicative of the resource reservation request message, a requesting person's identification (ID) 1430, communication destination information 1440 such as a network address of the communication destination user equipment and the like, communication quality information 1450 such as a band used for the communication, a communication delay permissible range, and the like, communication time information 1460 including communication start time and end time, and requesting person's certification information 1470 such as the ID or electronic signature data of the requesting person.

Figure 39:
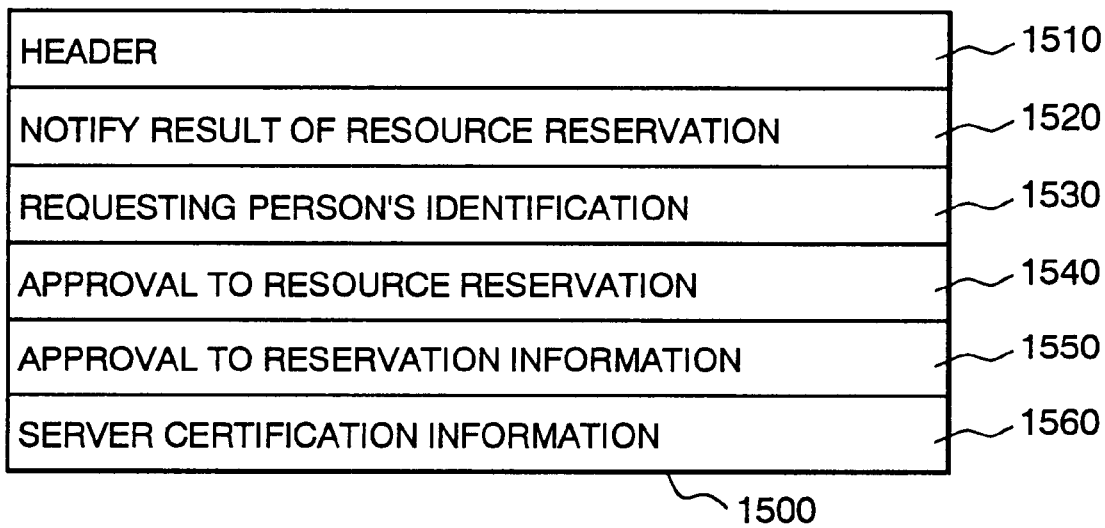
FIG. 39 is a diagram showing a data format of the resource reservation approval message.

FIG. 39 is a data format of a resource reservation approval message.

The resource reservation approval message 1500 consists of header information 1510, a code 1520 indicative of a resource reservation result notice message, requesting person's ID 1530, a code 1540 indicative of approval to the resource reservation, reservation approval information 1550 such as a reservation approval number, and server certification information 1560 including the server name, electronic signature data of the server, and the like.

Figure 40:
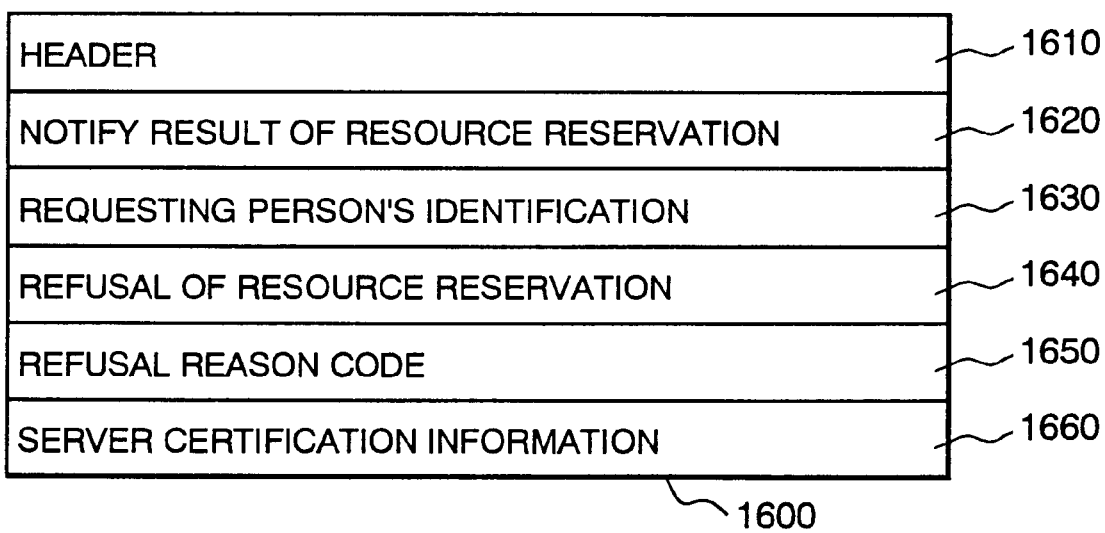
FIG. 40 is a diagram showing a data format of a resource reservation refusal message.

FIG. 40 shows a data format of a resource reservation refusal message.

The resource reservation refusal message 1600 has header information 1610, a code 1620 indicative of a resource reservation result notice message, the requesting person's ID 1630, a code 1640 indicative of resource reservation refusal, a reservation refusal reason code 1650, and server certification information 1660 including the server name, the electronic signature data of the server, and the like.

Figure 41:
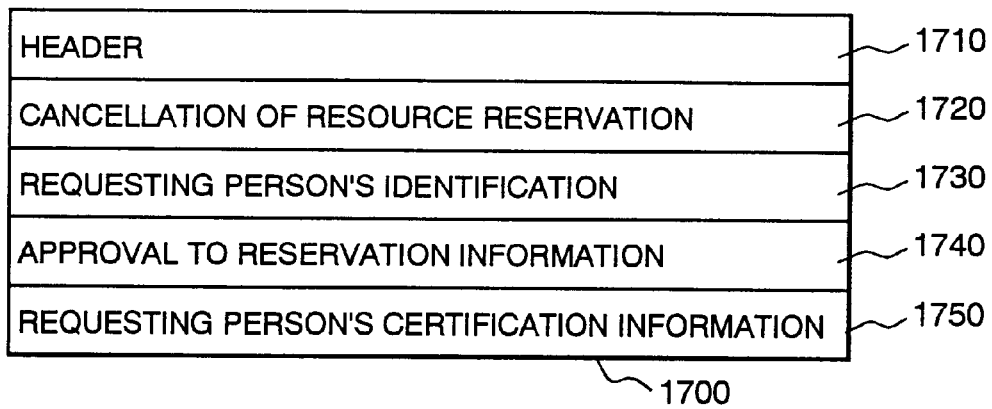
FIG. 41 is a diagram showing a data format of a resource reservation cancellation message.

FIG. 41 shows a data format of a resource reservation cancellation message.

The resource reservation cancellation message 1700 consists of header information 1710, a code 1720 indicative of a resource reservation invalid message, requesting person's ID 1730, reservation approval information 1740 such as reservation approval number, and server certification information 1750 including the server name, the electronic signature data of the server, and the like.

Figure 42:
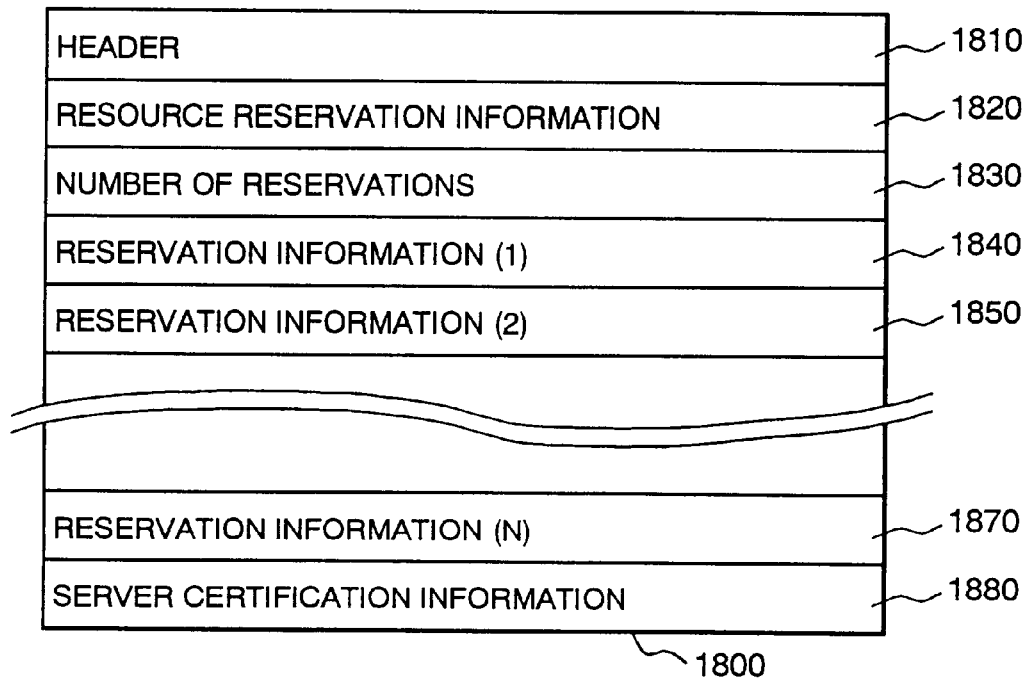
FIG. 42 is a diagram showing a data format of a resource reservation information message.

FIG. 42 shows a data format of a resource reservation information message 1800.

The resource reservation information message 1800 consists of header information 1810, a code 1820 indicative of the resource reservation information, the number 1830 of reservations included in the message, first reservation information 1840, second reservation information 1850, ..., Nth reservation information 1870, and server certification data 1840 including the server data, the electronic signature data of the server, and the like. Each reservation information includes information similar to that included in the reservation request message such as the requesting person's ID, the communication destination information, the communication quality information, and the like.

Figure 43:
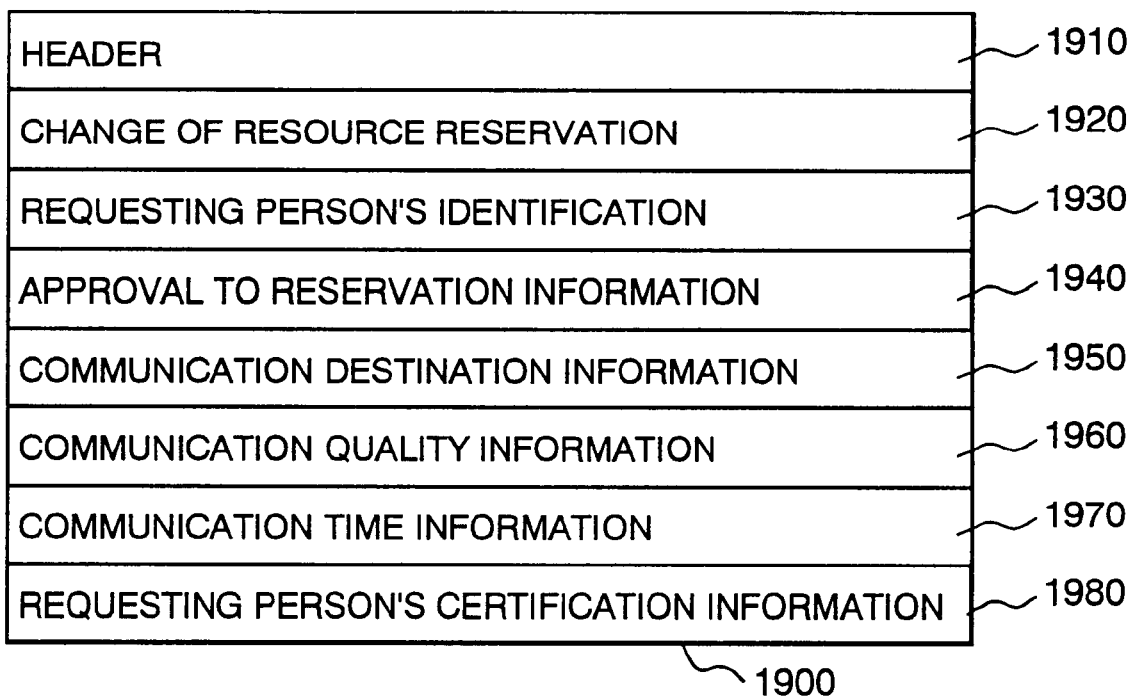
FIG. 43 is a diagram showing a data format of a resource reservation change message.

FIG. 43 shows a data format of a resource reservation change message 1900.

The resource reservation change message 1900 consists of header information 1910, a code 1920 indicative of change of resource reservation, requesting person's ID 1930, reservation approval information 1940 such as reservation approval number, communication destination information 1950 such as a network address of the communication destination user equipment, communication quality information 1960 including a band used for the communication, a communication delay permissible range, and the like, communication time information 1970 such as communication start time and end time, and requesting person's certification information 1980 such as the ID and electronic signature data of the requesting person.

Figure 44:
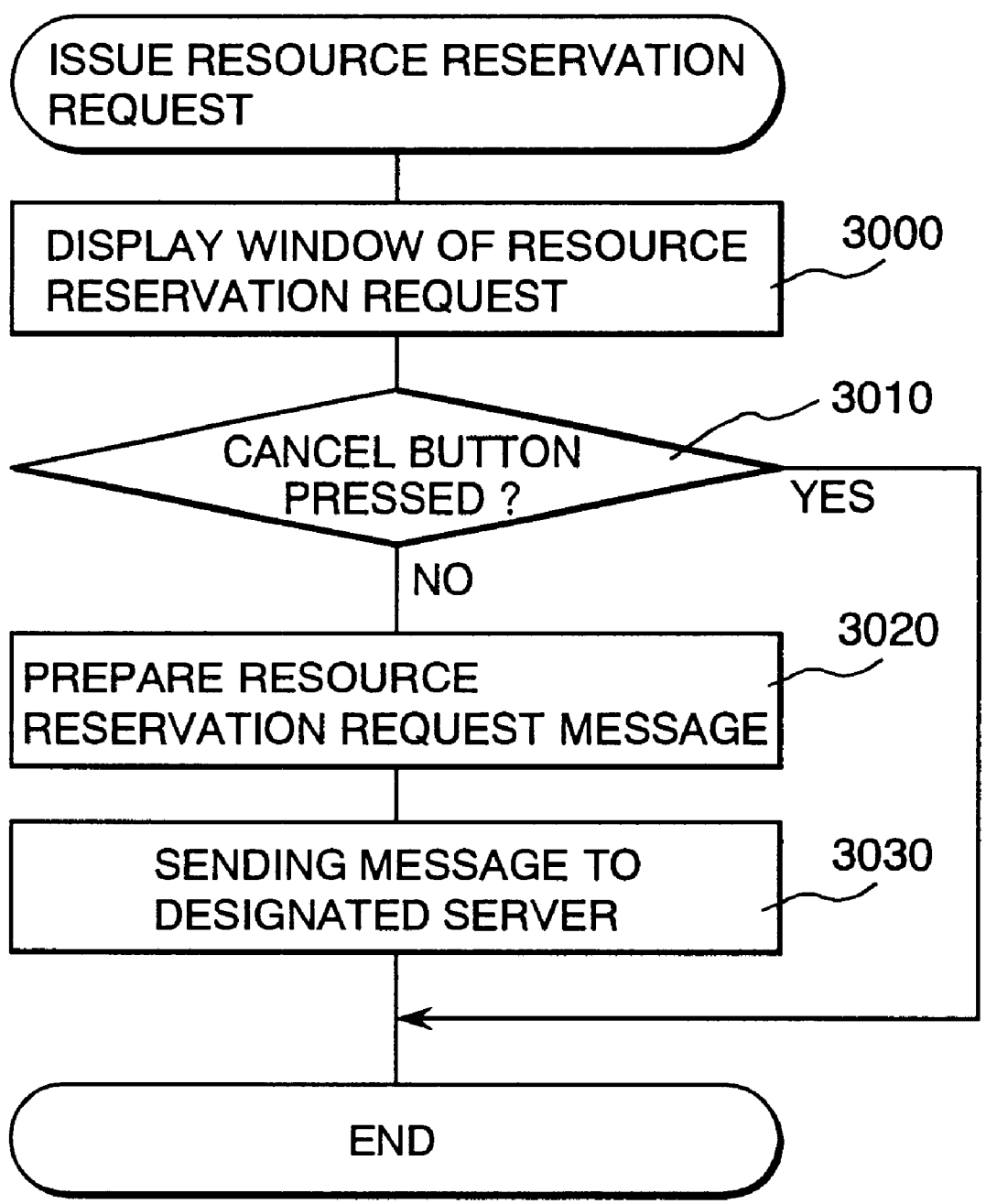
FIG. 44 is a diagram showing the flow of a resource reservation request issuing process.

FIG. 44 shows the flow of the resource reservation result notifying process.

The resource reservation user interface program of the user equipment displays the resource reservation request window (step 3000). A check is made to see if the user depressed the cancellation button (step 3010). If the cancellation button is depressed, the processing routine is finished. If the cancellation button has not been depressed, the resource reservation request message is formed (step 3020). The formed resource reservation request message is sent to the resource management server (step 3030).

Figure 45:
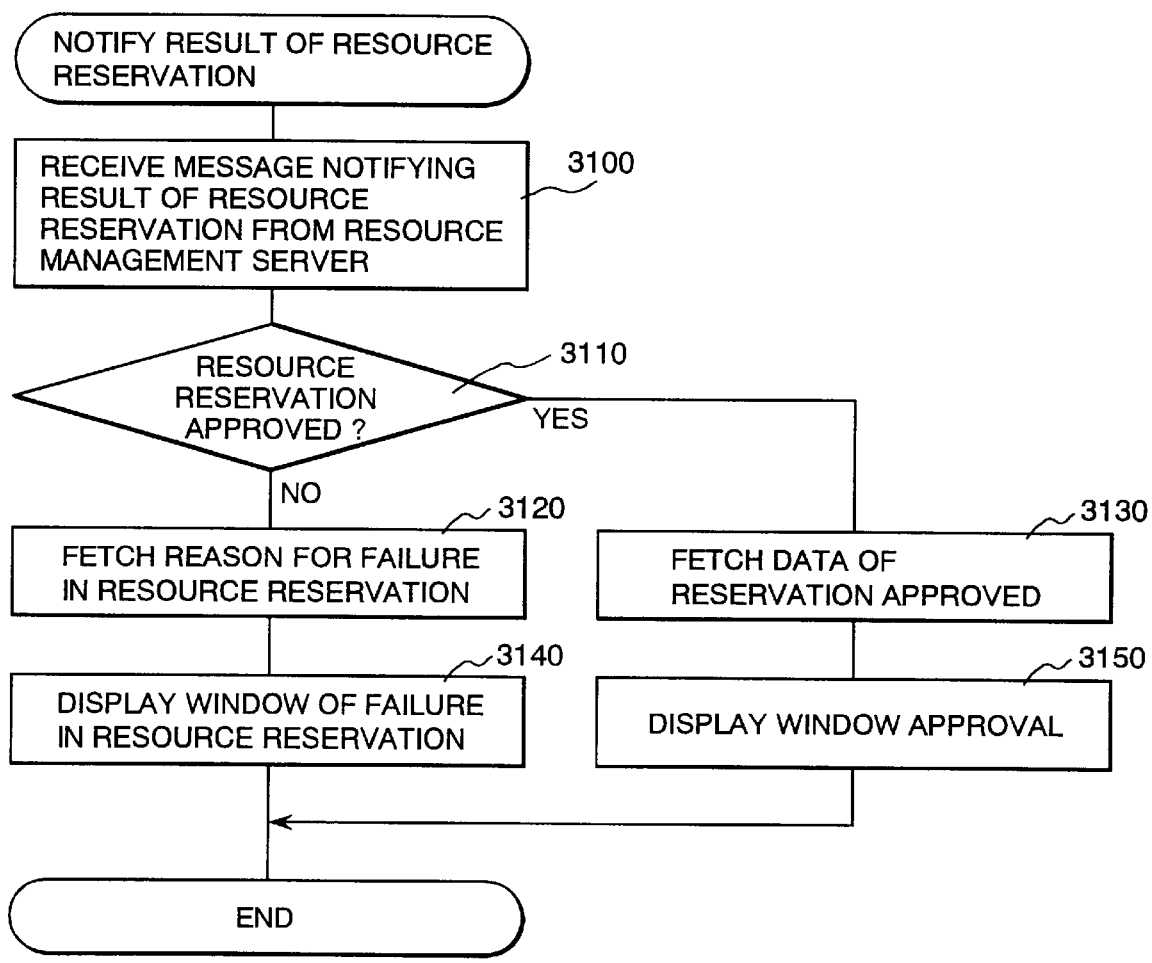
FIG. 45 is a diagram showing the flow of a resource reservation request result notifying process.

FIG. 45 shows the flow of the resource reservation result notifying process.

The resource reservation user interface program of the user equipment receives a resource reservation result notice message from the resource management server (step 3100). The contents of the resource reservation result notice message are checked (step 3110). If the resource reservation is approved, reservation approval data is taken out from the resource reservation result notice message (step 3130). The resource reservation approval window is displayed and the taken reservation approval data is displayed (step 3150). If the resource reservation is refused, a reservation failure reason is taken out from the resource reservation result notice message (step 3120). The resource reservation failure window is displayed and the reservation failure reason is displayed (step 3140).

Figure 46:
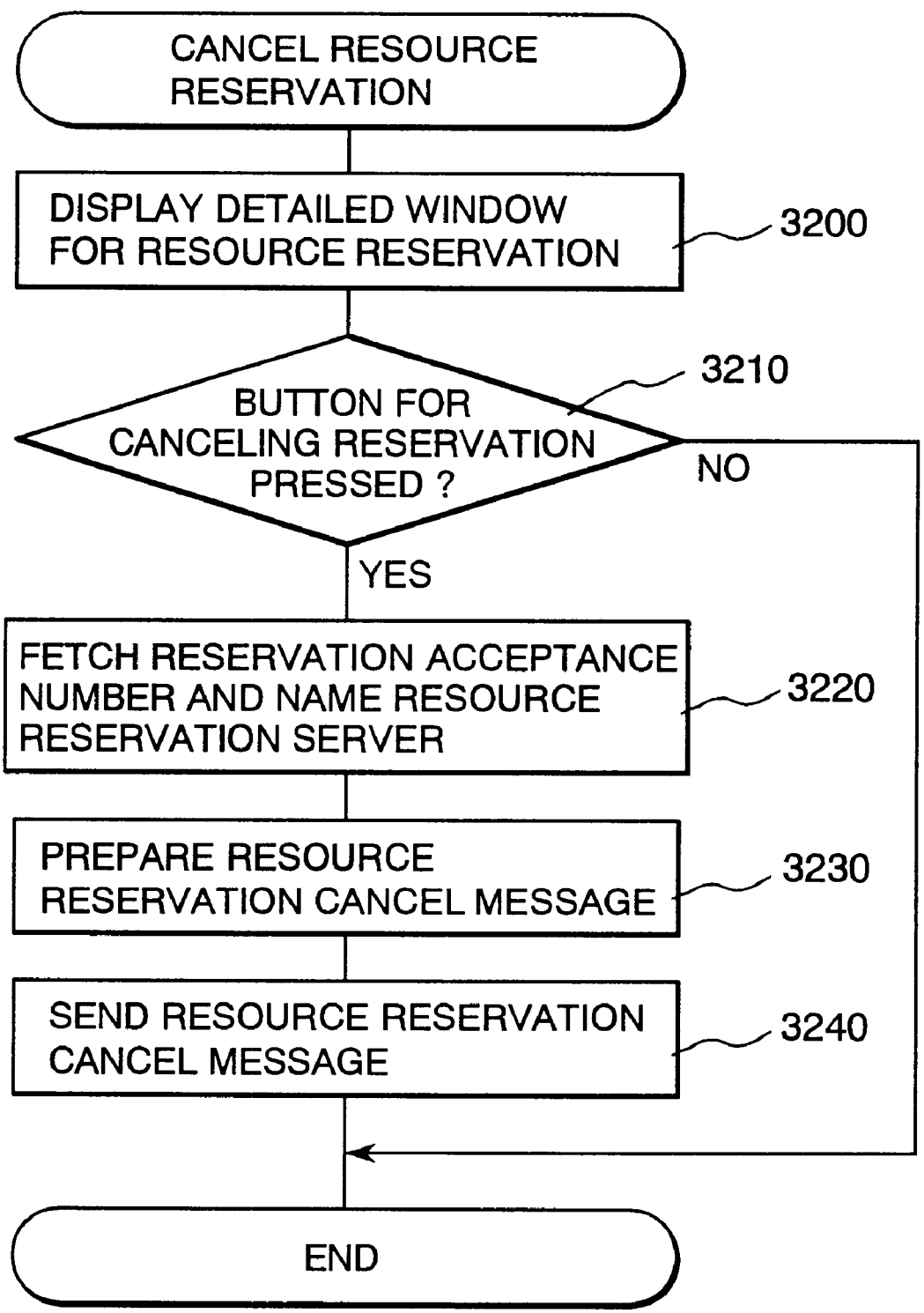
FIG. 46 is a diagram showing the flow of a resource reservation request cancelling process.

FIG. 46 shows the flow of a resource reservation cancelling process.

The resource reservation user interface program of the user equipment displays the resource reservation detail window (step 3200). A check is made to see whether the reservation cancellation button is depressed on the resource reservation window or not (step 3210). If the reservation cancellation button is depressed, the reservation receipt number of the reservation, the resource reservation server name, and the reservation number are taken out (step 3220). The resource reservation cancellation message is formed on the basis of the taken reservation receipt number. The formed resource reservation cancellation message is sent to the resource management server (step 3240).

Figure 47:
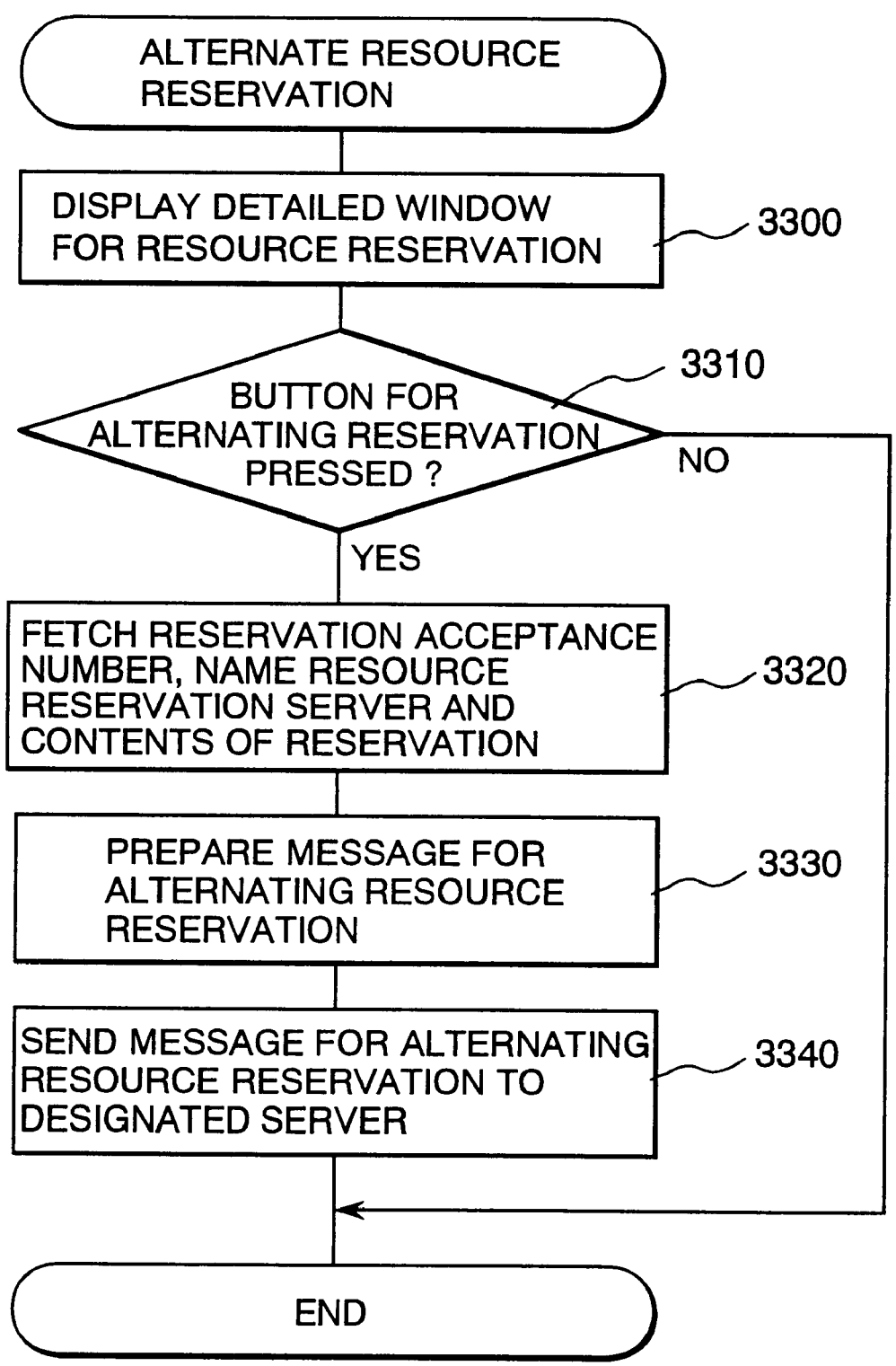
FIG. 47 is a diagram showing the flow of a resource reservation request changing process.

FIG. 47 shows the flow of the resource reservation changing process.

The resource reservation user interface program of the user equipment displays the resource reservation detail window (step 3300). A check is made to see whether the reservation change button has been depressed on the resource reservation detail window or not (step 3310). If the reservation change button has been depressed, the reservation receipt number of the reservation, the resource reservation server name, and the reservation number are taken out (step 3320). The resource reservation change message is formed on the basis of the taken reservation receipt number (step 3330). The formed resource reservation change message is sent to the resource management server (step 3340).

Figure 48:
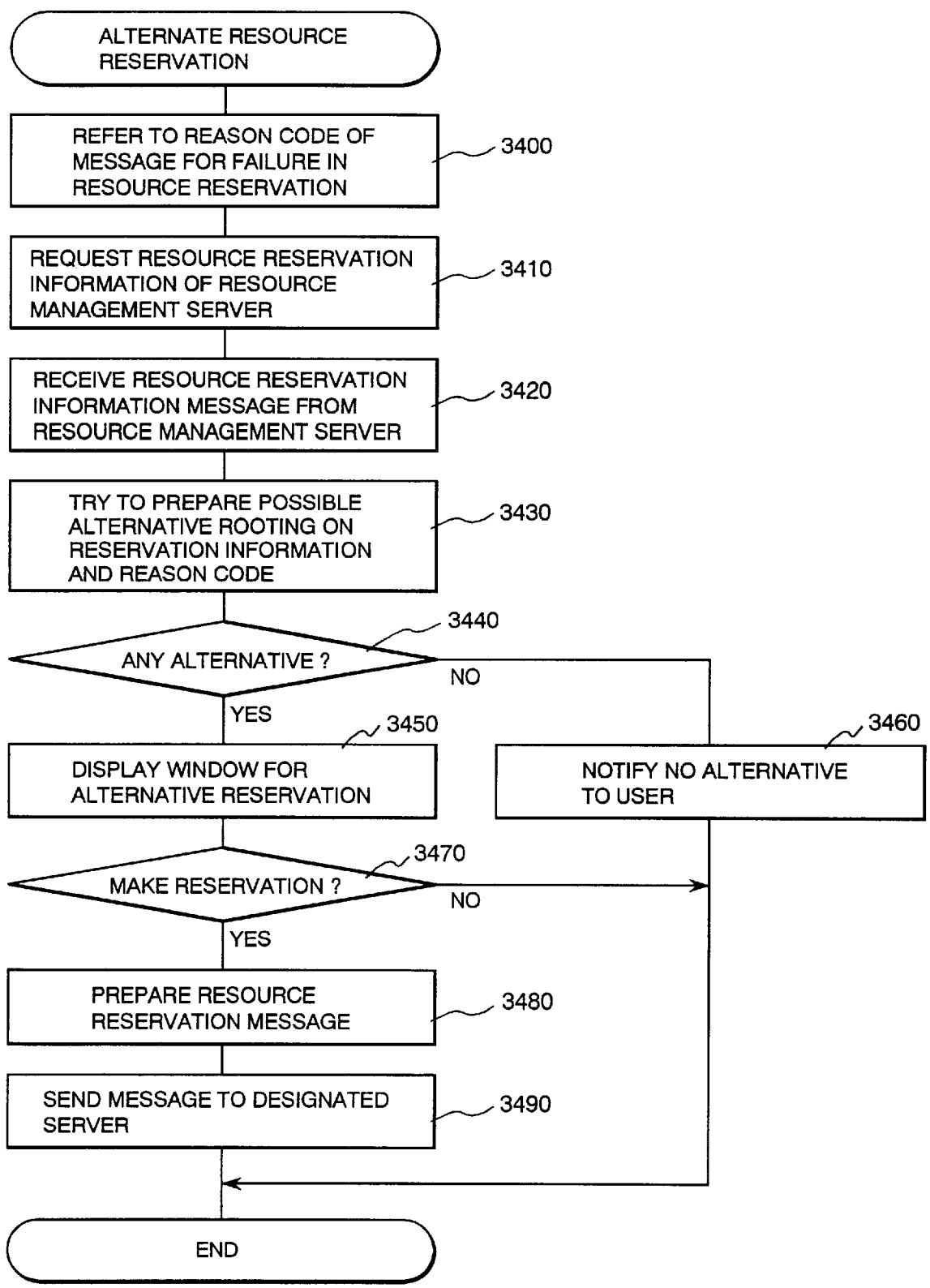
FIG. 48 is diagram showing the flow of an alternative reservation offering process.

FIG. 48 shows the flow of the alternate reservation offering process.

The reason code of the resource reservation failure message is referred to (step 3400). The resource reservation information is requested to the resource management server (step 3410). The resource reservation information message is received from the resource management server (step 3420). An alternative plan which seems to realize reservation is formed from the reservation information and the reason code (step 3430). It is determined if there is an alternative plan (step 3440). If there is an alternative plan, the alternative reservation window is displayed (step 3450). If there is no alternative plan, the fact that there is no alternative plan is notified to the user (step 3460). It is determined whether the reservation is performed or not on the basis of the alternate plan (step 3470). If the reservation is performed, the resource reservation request message is formed (step 3480). The formed resource reservation message is sent to the designated resource management server (step 3490).

What is claimed is:

1. A network connecting a plurality of switching nodes to which a plurality of user terminals are linked, wherein each user terminal has reservation requesting means for sending a resource reservation request in which time information indicative of a time and date to perform a communication is designated to a switching node to which said user terminal is linked, each switching node includes:

managing means for managing a reservation state of each of resources which can be used by said switching node among resources of said network together with time information indicative of time and date when a communication using said resources is performed, and reserving means for obtaining a resource which is not reserved at a time and date indicated by said time information when the resource reservation request in which said time information is designated is received and for reserving the resource as a resource to be used in the communication performed at the time and date shown by said time information.

2. The network according to claim 1, wherein each switching node has reservation request transferring means for transferring the received resource reservation request to another switching node which is the next switching node in a communication path to a destination side user terminal of a communication using the resource reserved by said reserving means, wherein each switching node comprises:

reservation state notifying means for notifying all of other switching nodes of a reservation state when said reserving means reserves a resource, and storing means for storing and holding the same management contents as those of the managing means of all of the other switching nodes in accordance with the reservation state notified from the other switching node, and said reservation request transferring means for selecting another switching node having many reserved resources as a transfer destination of the received resource reservation request based on the stored contents of said storing means.

3. A network connecting a plurality of switching nodes to which a plurality of user terminals are linked, wherein each user terminal has reservation requesting means for sending a resource reservation request in which time information indicative of time to perform a communication is designated to a switching node to which said user terminal is linked, each switching node includes:

managing means for managing a reservation state of each of resources which can be used by said switching node among resources of said network together with time information indicative of time when a communication using said resources is performed, and reserving means for obtaining a resource which is not reserved at a time indicated by said time information when the resource reservation request in which said time information is designated is received and for reserving the resource as a resource to be used in the communication performed at the time shown by said time information, wherein said reservation requesting means further designates priority information indicative of reservation priority of the relevant communication for said resource reservation request, said managing means further manages the priority information indicative of the reservation priority of the communication using said resource with respect to each of the resources which can be used by said switching node among the resources of said network, and said reserving means invalidates a reservation of any resource used for a communication having reservation priority lower than the reservation priority shown by said priority information among the resources reserved at the time shown by said time information when the resource reservation request in which said time information and said priority information is designated is received and there is no unreserved resource at the time indicated by said time information and said reserving means reserves the resource whose reservation is invalidated as a resource to be used in the communication performed at the time shown by said time information.

4. A network connection a plurality of switching nodes to which a plurality of user terminals are linked, wherein each user terminal has reservation requesting means for sending a resource reservation request in which permissible time range information indicative of a permissible time range of time and date to perform a communication and communication quantity information indicative of a quantity of data to be transferred by the communication is designated to a switching node to which said user terminal is linked, each switching node includes:

managing means for managing a reservation state of each of resources which can be used by said switching node among resources of the network together with time information indicative of time and date when a communication using said resource is performed, and reserving means for obtaining an arbitrary time and date when an activity ratio of the resource is low within the permissible time range indicated by said permissible time range information and a resource which is not reserved at said time and date when the resource reservation request in which said permissible time range information and said communication quantity information is designated is received and for reserving the obtained resource as a resource to be used in the communication for transferring data of the quantity indicated by said communication quantity information at the obtained time and date.

5. A network connection a plurality of switching nodes to which a plurality of user terminals are linked, wherein each user terminal has reservation requesting means for sending a resource reservation request in which permissible time range information indicative of a permissible time range of time to perform a communication and communication quantity information indicative of a quantity of data to be transferred by the communication is designated to a switching node to which said user terminal is linked, each switching node includes:

managing means for managing a reservation state of each of resources which can be used by said switching node among resources of the network together with time information indicative of time when a communication using said resource is performed, and reserving means for obtaining an arbitrary time when an activity ratio of the resource is low within the permissible time range indicated by said permissible time range information and a resource which is not reserved at said time when the resource reservation request in which said permissible time range information and said communication quantity information is designated is received and for reserving the obtained resource as a resource to be used in the communication for transferring data of the quantity indicated by said communication quantity information at the obtained time, wherein said reservation requesting means further designates priority information indicative of reservation priority of the relevant communication in said resource reservation request, said managing means further manages the priority information indicative of the reservation priority of the communication using said resource with respect to each of resources which can be used by said switching node among the resources of said network, said reserving means invalidates a reservation of any resource used in a communication having reservation priority lower than the reservation priority indicated by said priority information among the reserved resources within the permissible time range indicated by said permissible time range information when the resource reservation request in which said permissible time range information, said communication quantity information and said priority information is designated is received and there is no unreserved resource within the permissible time range indicated by said permissible time range information, said reserving means reserves the resource whose reservation is invalidated is reserved as a resource used for a communication for transferring data of the quantity indicated by said communication quantity information at the time when said resource was reserved.

6. A network connecting a plurality of switching nodes to which a plurality of user terminals are linked, wherein each user terminal has reservation requesting means for sending a resource reservation request in which time information indicative of a time to perform a communication is designated to a switching node to which said user terminal is linked, each switching node includes:

managing means for managing a reservation state of each of resources which can be used by said switching node among resources of said network together with time information indicative of time when a communication using said resources is performed, and reserving means for obtaining a resource which is not reserved at a time indicated by said time information when the resource reservation request in which said time information is designated is received an d for reserving the resource as a resource to be used in the communication performed at the time shown by said time information, wherein each switching node comprises:

failure notice sending means, when there is a resource which cannot be maintained to be reserved by a failure detected by said switching node and a transmission side user terminal and a destination side user terminal of a communication using said resource are not linked to said switching node, for sending a failure notice indicative of the communication using said resource to both of another switching node which is the next switching node of a communication path to said transmission side user terminal and another switching node which is the next switching node of a communication path to said destination side user terminal;

failure notice transferring means, when the failure notice is received from the other switching node and a transmission side user terminal and a destination side user terminal of a communication indicated by said failure notice are not linked to the self switching node, for transferring the received failure notice to both of another switching node which is the next switching node of a communication path to said transmission side user terminal and another switching node which is the next switching node of a communication path to said destination side user terminal; and re-reserving means, when there is a resource which cannot be maintained to be reserved by a failure detected by said switching node and a transmission side user terminal of a communication using said resource is linked to said switching node, for generating a resource reservation request of the communication using said resource and transferring the generated resource reservation request to another switching node which is the next switching node of another communication path to a destination side user terminal of the communication using said resource, and when a failure notice is received from another switching node and a transmission side user terminal of a communication shown by said failure notice is connected to said switching node, for generating a resource reservation request of the communication indicated by said failure notice and transferring the generated resource reservation request to another switching node which is the next switching node of another communication path to the destination side user terminal of the communication indicated by said failure notice.

7. A switching node used in a network connecting a plurality of switching nodes to which a plurality of user terminals are linked, comprising:

managing means for managing a reservation state of each of resources which can be used by said switching node among resources of said network together with time information indicative of time and date when a communication using said resource is performed; and reserving means for obtaining a resource which is not reserved at a time and date indicated by said time information when the resource reservation request in which the time information indicative of a time and date to perform a communication is designated is received and a reserving the obtained resource as a resource to be used in the communication performed at the time and date shown by said time information.

8. The switching node according to claim 7, wherein when a resource reservation request in which permissible time range information indicative of a permissible time range of time and date when a communication is performed and communication quantity information indicative of quantity of data to be transferred in said communication is designated is received, said reserving means obtains an arbitrary time when an activity ratio of resources is low within the permissible time range indicated by said permissible time range information a resource which is not reserved at said time and date and reserves the obtained resource as a resource to be used for a communication for transferring data of a quantity indicated by said communication quantity information at the obtained time and date.

9. A switching node used in a network connecting a plurality of switching nodes to which a plurality of user terminals are linked, comprising:

managing means for managing a reservation state of each of resources which can be used by said switching node among resources of said network together with time information indicative of time when a communication using said resource is performed; and reserving means for obtaining a resource which is not reserved at a time indicated by said time information when the resource reservation request in which the time information indicative of a time to perform a communication is designated is received and a reserving the obtained resource as a resource to be used in the communication performed at the time shown by said time information, wherein said managing means further manages priority information indicative of reservation priority of a communication using a resource with respect to each of resources which can be used by said switching node among resources of said network, and when a resource reservation request in which said time information and priority information indicative of reservation priority of a communication is designated is received and there is no unreserved resource at a time and date indicated by said time information, said reserving means invalidates a reservation of any resource used in a communication having reservation priority lower than the reservation priority indicated by said priority information and reserves the resource whose reservation is invalidated as a resource to be used for a communication performed at a time indicated by said time information.

10. A switching node used in a network connecting a plurality of switching nodes to which a plurality of user terminals are linked, comprising:

managing means for managing a reservation state of each of resources which can be used by said switching node among resources of said network together with time information indicative of time when a communication using said resource is performed; and reserving means for obtaining a resource which is not reserved at a time indicated by said time information when the resource reservation request in which the time information indicative of a time to perform a communication is designated is received and a reserving the obtained resource as a resource to be used in the communication performed at the time shown by said time information, wherein when a resource reservation request in which permissible time range information indicative of a permissible time range of time when a communication is performed and communication quantity information indicative of quantity of data to be transferred in said communication is designated is received, said reserving means obtains an arbitrary time when an activity ratio of resources is low within the permissible time range indicated by said permissible time range information a resource which is not reserved at said time and reserves the obtained resource as a resource to be used for a communication for transferring data of a quantity indicated by said communication quantity information at the obtained time and date, wherein said managing means further manages priority information indicative of reservation priority of a communication using a resource with respect to each of resources which can be used by said switching node among resources of said network, when a resource reservation request in which said time information and priority information indicative of reservation priority of a communication is designated is received and there is no unreserved resource at time indicted by said time information, said reserving means invalidates a reservation of any resource used in a communication having reservation priority lower than the reservation priority indicated by said priority information and reserves the resource whose reservation is invalidated as a resource to be used for a communication at time indicated by said time information, and when a resource reservation request in which said permissible time range information, said communication quantity information, and priority information indicative of reservation priority of a communication is designated is received and there is no unreserved resource within the permissible time range indicated by said permissible time range information, said reserving means invalidates a reservation of any resource used in a communication having reservation priority lower than reservation priority indicated by said priority information among reserved resources within the permissible time range indicated by said permissible time range information and reserves the resource whose reservation is invalidated as a resource used for a communication for transferring data of a quantity indicated by said communication quantity information at a time said resource was reserved.

11. A switching node used in a network connecting a plurality of switching nodes to which a plurality of user terminal are linked, comprising:

managing means for managing a reservation state of each of resources which can be used by said switching node among resources of said network together with time information indicative of time and date when a communication using the resource is performed; and reserving means, when a resource reservation request in which permissible time range information indicative of a permissible time range of time and date when a communication is performed and communication quantity information indicative of a quantity of data to be transferred by said communication is designated is received, for obtaining an arbitrary time when an activity ratio of resources within the permissible time range indicated by said permissible time range information is low and a resource which is not reserved at said time and for reserving the obtained resource as a resource to be used in the communication for transferring data of a quantity indicated by said communication quantity information at the obtained time and date.

12. A switching node used in a network connecting a plurality of switching nodes to which a plurality of user terminal are linked, comprising:

managing means for managing a reservation state of each of resources which can be used by said switching node among resources of said network together with time information indicative of time when a communication using the resource is performed; and reserving means, when a resource reservation request in which permissible time range information indicative of a permissible time range of time when a communication is performed and communication quantity information indicative of a quantity of data to be transferred by said communication is designated is received, for obtaining an arbitrary time when an activity ratio of resources within the permissible time range indicated by said permissible time range information is low and a resource which is not reserved at said time and for reserving the obtained resource as a resource to be used in the communication for transferring data of a quantity indicated by said communication quantity information at the obtained time, wherein said managing means further manages priority information indicative of reservation priority of a communication using a resource with respect to each of resources which can be used by said switching node among resources of said network, and when a resource reservation request in which said permissible time range information, said communication quantity information and priority information indicative of reservation priority of a communication is designated is received and there is no unreserved resource in a permissible time range indicted by said permissible time range information, said reserving means invalidates a reservation of any resource used in a communication having reservation priority lower than the reservation priority shown by said priority information among reserved resources within the permissible time range indicated by said permissible time range information and reserves the resource whose reservation is invalidated as a resource to be used for a communication of transferring data of a quantity indicated by said communication quantity information.

13. The switching node according to claim 8, further comprising:

reservation request transferring means for transferring the received resource reservation request to another switching node which is the next switching node of a communication path to a destination side user terminal of a communication using the resource reserved by said reserving means;

reservation state notifying means for notifying a reservation state to all of the other switching nodes when said reserving means reserves a resource; and storing means for storing and holding the same management contents as those of the managing means of all of the other switching nodes in accordance with the reservation state notified from the other switching nodes, and wherein said reservation request transferring means selects another switching node having many unreserved resources as a transfer destination of the received resource reservation request based on the stored contents of said storing means.

14. A switching node used in a network connecting a plurality of switching nodes to which a plurality of user terminals are linked, comprising:

managing means for managing a reservation state of each of resources which can be used by said switching node among resources of said network together with time information indicative of time when a communication using said resource is performed; and reserving means for obtaining a resource which is not reserved at a time indicated by said time information when the resource reservation request in which the time information indicative of a time to perform a communication is designated is received and a reserving the obtained resource as a resource to be used in the communication performed at the time shown by said time information, reservation request transferring means for transferring the received resource reservation request to another switching node which is the next switching node of a communication path to a destination side user terminal of a communication using the resource reserved by said receiving means, further comprising:

failure notice sending means, when there is a resource which cannot be maintained to be reserved by a failure detected by said switching node and a transmission side user terminal and a destination side user terminal of a communication using said resource are not lined to said switching node, for sending a failure notice indicative of the communication using said resource to another switching node which is the next switching node of a communication path to said transmission side user terminal and another switching node which is the next switching node of a communication path to said destination side user terminal;

failure notice transferring means, when the failure notice is received from the other switching node and a transmission side user terminal and a destination side user terminal of a communication indicated by said failure notice are not linked to said switching node, for transferring the received failure notice to both of another switching node which is the next switching node of a communication path to said transmission side user terminal and another switching node which is the next switching node of a communication path to said destination side user terminal; and re-reserving means, when there is a resource which cannot be maintained to be reserved by a failure detected by said switching node and a transmission side user terminal of a communication using said resource is linked to said switching node, for generating a resource reservation request of the communication using said resource and transferring the generated resource reservation request to another switching node which is the next switching node of another communication path to a destination side user terminal of the communication using said resource, and when a failure notice is received from another switching node and a transmission side user terminal of a communication shown by said failure notice is linked to said switching node, for generating a resource reservation request of the communication indicated by said failure notice and transferring the generated resource reservation request to another switching node which is the next switching node of another communication path to the destination side user terminal of the communication indicated by said failure notice.

15. A network resource reserving method wherein, in a network having the function of reserving a network resource with designation of communication destination information and communication quality information, a user interface program executed by user equipment obtains communication destination information and communication quality information desired by the user, and a network resource management program executed by either a server device or a node device which receives a network resource reservation request receives reservation request information transmitted from said user interface program, analyzes said reservation request information, and approves or refuses the reservation request on the basis of set rules, wherein when the network resource reservation request from a client is refused, the reason of refusal of the request is notified, wherein the user interface program inquires of the network resource management program in response to a request from the user and presents information regarding conditions of the network resource reservation state to the user.

16. The method according to claim 15, wherein whether the reservation request received by the network resource management program is accepted or not is determined after referring to user certification data included in the reservation request and sending an inquiry to a user certification server when it is necessary.

17. The method according to claim 15, wherein the network reservation state by the client can be recognized by a graphical user interface conformed to an internet standard protocol.

18. The method according to claim 15, there is provided means for automatically calculating and offering an alternative plan when a resource reservation is failed.

19. The method according to claim 15, wherein a specific combination of the communication destination information and the communication quality information when the network resource is reserved is preliminarily defined as a reservation template and a network resource reservation request in which the communication destination and communication quality are defined can be issued only by designating said reservation template when a network resource is reserved.

* * * * *